US012731786B2

(12) United States Patent
Kuroda et al.

(10) Patent No.: US 12,731,786 B2
(45) Date of Patent: Sep. 8, 2026

(54) LITHIUM METAL COMPOSITE OXIDE, POSITIVE ELECTRODE ACTIVE SUBSTANCE FOR LITHIUM SECONDARY BATTERY, POSITIVE ELECTRODE FOR LITHIUM SECONDARY BATTERY, LITHIUM SECONDARY BATTERY, AND METHOD FOR PRODUCING LITHIUM METAL COMPOSITE OXIDE

(71) Applicant: Sumitomo Metal Mining Co., Ltd., Tokyo (JP)

(72) Inventors: Tomoya Kuroda, Fukui (JP); Yuichi Sato, Niihama (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 957 days.

(21) Appl. No.: 17/791,161

(22) PCT Filed: Jan. 8, 2021

(86) PCT No.: PCT/JP2021/000492

§ 371 (c)(1),
(2) Date: Jul. 6, 2022

(87) PCT Pub. No.: WO2021/141112

PCT Pub. Date: Jul. 15, 2021

(65) Prior Publication Data

US 2023/0039190 A1 Feb. 9, 2023

(30) Foreign Application Priority Data

Jan. 9, 2020 (JP) ................................. 2020-002395

(51) Int. Cl.
*H01M 4/525* (2010.01)
*H01M 4/02* (2006.01)
(Continued)

(52) U.S. Cl.
CPC .......... *H01M 4/525* (2013.01); *H01M 4/043* (2013.01); *H01M 4/0471* (2013.01);
(Continued)

(58) Field of Classification Search
None
See application file for complete search history.

(56) References Cited

U.S. PATENT DOCUMENTS

| | | |
|---|---|---|
| 2004/0131934 A1 | 7/2004 | Sugnaux et al. |
| 2007/0082265 A1 | 4/2007 | Itou et al. |

(Continued)

FOREIGN PATENT DOCUMENTS

| | | |
|---|---|---|
| CN | 1520620 A | 8/2004 |
| CN | 101989653 A | 3/2011 |

(Continued)

OTHER PUBLICATIONS

Korean Office Action dated Sep. 26, 2023 issued in the corresponding Korean Patent Application No. 10-2022-7023106, with partial English translation and summary by the applicant.

(Continued)

*Primary Examiner* — Kevin M Bernatz
(74) *Attorney, Agent, or Firm* — Rimon P.C.

(57) ABSTRACT

A lithium metal composite oxide having a layered structure, including at least lithium and an element X, wherein:the element X is at least one element selected from the group consisting of Co, Mn, Fe, Cu, Ti, Mg, Al, W, Mo, Nb, Zn, Sn, Zr, Ga, V, B, Si, S and P; the lithium metal composite oxide contains single particles and satisfies all of requirements (1) to (5):(1): a volume-based 50% cumulative particle size $D_{50}$ of the lithium metal composite oxide is 2 μm or more and 10 μm or less; (2): the single particles have, on at least a part of surfaces thereof, adhered fine particles, with the proviso that a maximum particle size of the adhered fine (Continued)

particles is smaller than a particle size of the single particles; (3): the particle size of the single particles is 0.2 to 1.5 times $D_{50}$ of the lithium metal composite oxide; (4): a particle size of the adhered fine particles is 0.01 to 0.1 times the $D_{50}$ of the lithium metal composite oxide; and (5): an average number of the adhered fine particles adhered per particle of the single particles is 1 or more and 30 or less as measured with respect to a range observable in an image obtained by scanning electron microscope.

18 Claims, 6 Drawing Sheets

(51) Int. Cl.
*H01M 4/04* (2006.01)
*H01M 4/505* (2010.01)
*H01M 10/0525* (2010.01)

(52) U.S. Cl.
CPC ....... *H01M 4/505* (2013.01); *H01M 10/0525* (2013.01); *H01M 2004/021* (2013.01); *H01M 2004/028* (2013.01)

(56) References Cited

U.S. PATENT DOCUMENTS

| | | | | |
|---|---|---|---|---|
| 2008/0102372 | A1 | 5/2008 | Ohishi | |
| 2009/0008602 | A1* | 1/2009 | Yoshida | H01M 4/131 252/182.1 |
| 2010/0047691 | A1* | 2/2010 | Kawakami | H01M 4/485 429/224 |
| 2014/0356718 | A1* | 12/2014 | Ito | H01M 4/525 429/223 |
| 2017/0221644 | A1 | 8/2017 | Kubota et al. | |
| 2017/0288222 | A1 | 10/2017 | Kobayashi | |
| 2017/0288223 | A1* | 10/2017 | Ogawa | H01M 4/505 |
| 2019/0330072 | A1* | 10/2019 | Imanari | C01D 15/02 |
| 2019/0393479 | A1 | 12/2019 | Kim et al. | |
| 2020/0203728 | A1 | 6/2020 | Ogawa et al. | |
| 2020/0295367 | A1* | 9/2020 | Yoo | H01M 4/1391 |
| 2021/0013506 | A1 | 1/2021 | Takamori et al. | |
| 2021/0013508 | A1 | 1/2021 | Kuroda | |

FOREIGN PATENT DOCUMENTS

| | | | |
|---|---|---|---|
| CN | 106463696 | A | 2/2017 |
| CN | 109476506 | A | 3/2019 |
| CN | 110072816 | A | 7/2019 |
| CN | 110137431 | A | 8/2019 |
| EP | 3 225 592 | A1 | 10/2017 |
| EP | 3 550 644 | A2 | 10/2019 |
| EP | 3 920 275 | A1 | 12/2021 |
| EP | 3 954 659 | A1 | 2/2022 |
| JP | 07-114915 | A | 5/1995 |
| JP | 09-035715 | A | 2/1997 |
| JP | 2002-075368 | A | 3/2002 |
| JP | 2005-190996 | A | 7/2005 |
| JP | 2007-280943 | A | 10/2007 |
| JP | 2008-108574 | A | 5/2008 |
| JP | 2009-193686 | A | 8/2009 |
| JP | 2014-162651 | A | 9/2014 |
| JP | 2017-107827 | A | 6/2017 |
| JP | 2018-063951 | A | 4/2018 |
| JP | 2018-116903 | A | 7/2018 |
| JP | 2018-125305 | A | 8/2018 |
| JP | 2019-160571 | A | 9/2019 |
| JP | 2019-160572 | A | 9/2019 |
| JP | 6650064 | B1 | 2/2020 |
| JP | 6659893 | B | 3/2020 |
| KR | 10-2013-0107892 | A | 10/2013 |
| WO | 02/41417 | A1 | 5/2002 |
| WO | 2019/103458 | A1 | 5/2019 |

OTHER PUBLICATIONS

Extended European Search Report received in EP Application No. 21738165.6 dated Feb. 2, 2024.

Chinese Third Party Observation issued in corresponding Chinese Patent Application No. 202180008235.3, dated Jul. 18, 2023, with partial English translation.

European Third Party Observation issued in corresponding European Patent Application No. 21738165.6, dated Jul. 24, 2023.

International Search Report issued in corresponding International Patent Application No. PCT/JP2021/000492, dated Mar. 30, 2021, with English translation.

Japanese Notice of Reasons for Refusal issued in corresponding Japanese Patent Application No. 2020-002395, dated Jun. 30, 2020, with English translation.

Japanese Decision of Refusal issued in corresponding Japanese Patent Application No. 2020-002395, dated Oct. 13, 2020, with English translation.

Chinese Office Action issued in corresponding Chinese Patent Application No. 202180008235.3, dated Jul. 24, 2023, with partial English translation.

Yanping Yin, et al., "Effect of Different Second Particle Size on Rate Capability of Li-Rich Layered Cathode Materials Li1.2Mn0.54Ni0.13Co0.13O2", Chinese Journal of Inorganic Chemistry, vol. 31, No. 10, Oct. 10, 2015.

Atsushi Ito et al., "Local Structure of Li-rich Layered Cathode Material, Li[Ni0.17Li0.2Co0.07Mn0.56]O2," Electrochemistry vol. 78, 5th Edition, p. 380-383, Dec. 31, 2010.

* cited by examiner

LITHIUM METAL COMPOSITE OXIDE, POSITIVE ELECTRODE ACTIVE SUBSTANCE FOR LITHIUM SECONDARY BATTERY, POSITIVE ELECTRODE FOR LITHIUM SECONDARY BATTERY, LITHIUM SECONDARY BATTERY, AND METHOD FOR PRODUCING LITHIUM METAL COMPOSITE OXIDE

CROSS REFERENCE TO RELATED APPLICATIONS

This application is the U.S. National Phase under 35 U.S.C. § 371 of International Application No. PCT/JP2021/000492, filed on Jan. 8, 2021, which claims the benefit of Japanese Application No. 2020-002395, filed on Jan. 9, 2020, the entire contents of each are hereby incorporated by reference.

TECHNICAL FIELD

The present invention relates to a lithium metal composite oxide, a positive electrode active material for a lithium secondary battery, a positive electrode for a lithium secondary battery, a lithium secondary battery, and a method for producing a lithium metal composite oxide.

BACKGROUND ART

Lithium secondary batteries have already been put to practical use not only as compact power supplies for portable telephones, notebook computers and the like, but also as medium- or large-sized power supplies for automobile use, electric power storage use, etc. A lithium secondary battery includes a positive electrode containing a positive electrode active material. A lithium metal composite oxide is used as the positive electrode active material.

In order to improve the battery performance of the lithium secondary battery, a lithium metal composite oxide in which the surfaces of the lithium-containing composite oxide particles are coated with a lithium compound is used as the positive electrode active material.

For example, Patent Document 1 describes a positive electrode active material in which the surfaces of the particles represented by a general formula $LiNi_{1-x}M_xO_2$ (M is an element including at least one of Al, B and Co) are coated with fine particles represented by a general formula $LiFePO_4$.

CITATION LIST

Patent Document

[Patent Document 1]

Japanese Unexamined Patent Application Publication No. 2002-75368

SUMMARY OF INVENTION

Technical Problem

Lithium metal composite oxides with surface coating materials may improve battery performances. On the other hand, the coating materials pose a problem that depending on the thickness and presence of the coating materials itself, the insertion and desorption of lithium ions on the surface of the lithium metal composite oxide particles are hindered, resulting in an increase in the internal resistance of the secondary battery produced.

The present invention has been made in view of the above circumstances, and an object of the present invention is to provide a lithium metal composite oxide capable of reducing charge transfer resistance on the surface of particles of the lithium metal composite oxide; a positive electrode active material for a lithium secondary battery; a positive electrode for a lithium secondary battery; a lithium secondary battery; and a method for producing the lithium metal composite oxide.

Solution to Problem

In other words, embodiments of the present invention include the following inventions [1] to [16].

[1] A lithium metal composite oxide having a layered structure, including at least lithium, nickel, and an element X, wherein: the element X is at least one element selected from the group consisting of Co, Mn, Fe, Cu, Ti, Mg, Al, W, Mo, Nb, Zn, Sn, Zr, Ga, V, B, Si, S and P; the lithium metal composite oxide contains single particles and satisfies all of requirements (1) to (5):

(1): a volume-based 50% cumulative particle size $D_{50}$ of the lithium metal composite oxide is 2 μm or more and 10 μm or less;

(2): the single particles have, on at least a part of surfaces thereof, adhered fine particles, with the proviso that a maximum particle size of the adhered fine particles is smaller than a particle size of the single particles;

(3): the particle size of the single particles is 0.2 to 1.5 times the $D_{50}$ of the lithium metal composite oxide;

(4): a particle size of the adhered fine particles is 0.01 to 0.1 times the $D_{50}$ of the lithium metal composite oxide; and (5): an average number of the adhered fine particles adhered per particle of the single particles is 1 or more and 30 or less as measured with respect to a range observable in an image obtained by scanning electron microscope.

[2] The lithium metal composite oxide according to [1], wherein the maximum particle size of the adhered fine particles in the requirement (2) is 0.067 to 0.5 times the particle size of the single particles.

[3] The lithium metal composite oxide according to [1] or [2], wherein the adhered fine particles are adhered to a part of the surfaces of the single particles in a non-sintered state.

[4] The lithium metal composite oxide according to any one of [1] to [3], which has a nickel content, Ni/(Ni+X), of 0.4 or more, in terms of a molar ratio relative to a total amount of nickel and the element X.

[5] The lithium metal composite oxide according to any one of [1] to [4], which is represented by the following composition formula (B):

$$Li[Li_x(Ni_{(1-y-z-w)}Co_yMn_zM_w)_{1-x}]O_2 \quad (B)$$

wherein: M is at least one element selected from the group consisting of Fe, Cu, Ti, Mg, Al, W, Mo, Nb, Zn, Sn, Zr, Ga, V, B, Si, S and P; m and x, y, z and w satisfy $-0.1 \le x \le 0.2$, $0 \le y \le 0.4, 0 \le z \le 0.4, 0 \le w \le 0.1$, and $y+z+w \le 1$.

[5-1] The lithium metal composite oxide according to any one of [1] to [4], which is represented by the following composition formula (A):

$$Li[Li_m(Ni_{(1-n)}X_n)_{1-m}]O_2 \quad (A)$$

wherein: X is at least one element selected from the group consisting of Co, Mn, Fe, Cu, Ti, Mg, Al, W, Mo, Nb, Zn, Sn, Zr, Ga, V, B, Si, S and P; m and n satisfy $-0.1 \le m \le 0.2$, $0<n\le 0.6$ and $0<m+n<0.6$.

[6] The lithium metal composite oxide according to any one of [1] to [5] and [5-1], which has a BET specific surface area of 2 $m^2/g$ or less.

[7] The lithium metal composite oxide according to any one of [1] to [6] and [5-1], which includes core particles and a coating material covering the core particles.

[8] A positive electrode active material for a lithium secondary battery, the positive electrode active material including the lithium metal composite oxide of any one of [1] to [7] and [5-1].

[9] A positive electrode for a lithium secondary battery, the positive electrode including the positive electrode active material according to [8].

[10] A lithium secondary battery including the positive electrode according to [9].

[11] A method for producing the lithium metal composite oxide of any one of [I] to [7] and [5-1], including:

step (A) of calcining a mixture of a composite compound containing at least nickel, and a lithium compound containing a lithium element, thereby obtaining a calcined product; and step (B) of crushing the obtained calcined product to obtain a lithium metal composite oxide.

[12] The method according to [11], wherein the lithium metal composite oxide is represented by the following composition formula (B1), and the step (A) is a step (A1) of calcining the mixture at 900° C. or higher to obtain the calcined product:

$$Li[Li_x(Ni_{(1-y-z-w)}Co_yMn_zM_w)_{1-x}]O_2 \quad (B1)$$

wherein: M is at least one element selected from the group consisting of Fe, Cu, Ti, Mg, Al, W, Mo, Nb, Zn, Sn, Zr, Ga, V, B, Si, S and P; and x, y, z and w satisfy $-0.1\le x\le 0.2$, $0\le y\le 0.4, 0\le z\le 0.4. 0\le w\le 0.1$, and $0.4<y+z+w\le 1$.

[12-1] The method according to [11], wherein the lithium metal composite oxide is represented by the following composition formula (A1), and the step (A) is a step (A1) of calcining the mixture at 900° C. or higher to obtain the calcined product:

$$Li[Li_m(Ni_{(1-n)}X_n)_{1-m}]O_2 \quad (A1),$$

wherein: X is at least one element selected from the group consisting of Co, Mn, Fe, Cu, Ti, Mg, Al, W, Mo, Nb, Zn, Sn, Zr, Ga, V, B, Si, S and P; m and n satisfy $0\le m\le 0.2$, and $0.3<n\le 0.6$.

[13] The method according to [11], wherein the lithium metal composite oxide is represented by the following composition formula (B2), and the step (A) is a step (A2) of calcining the mixture at 750° C. or higher to obtain the calcined product:

$$Li[Li_x(Ni_{(1-y-z-w)}Co_yMn_zM_w)_{1-x}]O_2 \quad (B2),$$

wherein: M is at least one element selected from the group consisting of Fe, Cu, Ti, Mg, Al, W, Mo, Nb, Zn, Sn, Zr, Ga. V, B, Si, S and P; and x, y, z and w satisfy $-0.1\le x\le 0.2$, $0\le y\le 0.4, 0\le z\le 0.4, 0\le w\le 0.1$, and $0<y+z+w\le 0.4$.

[13-1] The method according to [11], wherein the lithium metal composite oxide is represented by the following composition formula (A2), and the step (A) is a step (A2) of calcining the mixture at 750° C. or higher to obtain the calcined product:

$$Li[Li_m(Ni_{(1-n)}X_n)_{1-m}]O_2 \quad (A2),$$

wherein: X is at least one element selected from the group consisting of Co, Mn, Fe, Cu, Ti, Mg, Al, W, Mo, Nb, Zn, Sn, Zr, Ga, V, B, Si, S and P; m and n satisfy $0\le m\le 0.2$, and $0<n\le 0.3$.

[14] The method according to any one of [11] to [13], [12-1] and [13-1], wherein the step (A) is a step of calcining the mixture under an oxygen atmosphere, and the ratio of the oxygen gas supply rate ($Nm^3/min$) to the supply rate of the mixture (kg/min) (oxygen gas supply rate/mixture supply rate) is 20 or less.

[14-1] The method according to any one of [11] to [13], [12-1] and [13-1], wherein the step (A) is a step of calcining the mixture under an oxygen atmosphere, and the ratio of the total supply amount of the oxygen gas ($Nm^3$) to the supply amount of the mixture (kg) (total oxygen gas supply amount/mixture supply amount) is 20 or less.

[15] The method according to any one of [11] to [14], [12-1], [13-1], or [14-1], wherein the step (B) includes a crushing step 1 in which the calcined product obtained in the calcination step is crushed until $D_{50}$ is reduced to 100 μm or less to obtain a crushed powder 1, and a subsequent crushing step 2 in which the crushed powder 1 is crushed until $D_{50}$ falls within a range of 2 μm to 7 μm to obtain a lithium metal composite oxide.

[16] The method according to any one of [11] to [15], wherein the step (B) is carried out by a roll mill, a disc mill, a pin mill, a ball mill, a jet mill, or a counter jet mill equipped with a classification rotor.

Advantageous Effects of Invention

The present invention can provide a lithium metal composite oxide capable of reducing charge transfer resistance on the surface of particles of the lithium metal composite oxide; a positive electrode active material for a lithium secondary battery; a positive electrode for a lithium secondary battery; a lithium secondary battery; and a method for producing the lithium metal composite oxide.

DESCRIPTION OF EMBODIMENTS

Figure 1A:
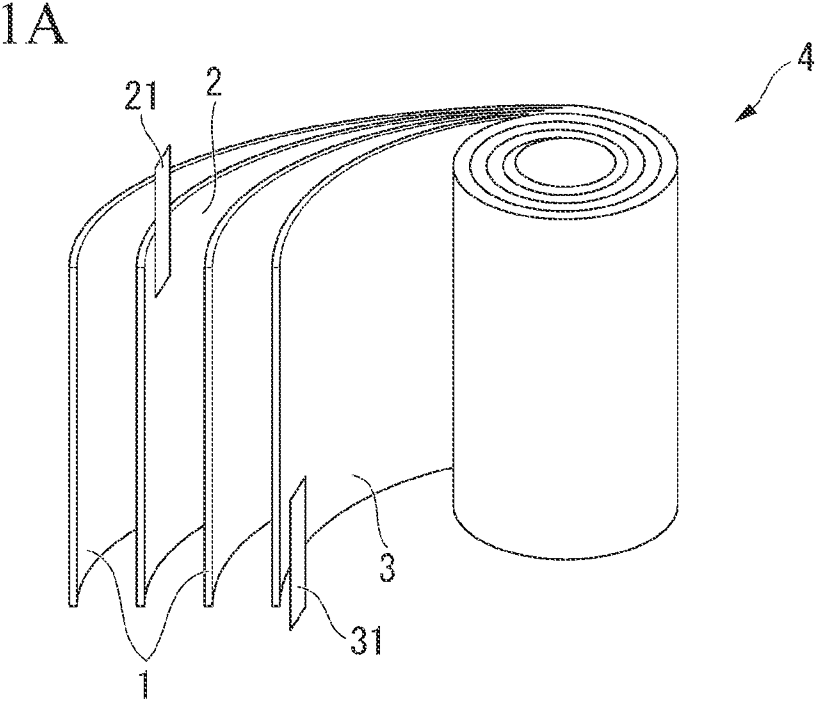
FIG. 1A is a schematic configuration diagram showing an example of a lithium secondary battery.

In the present specification, a metal composite compound is hereinafter referred to as "MCC", a lithium metal composite oxide is hereinafter referred to as "LiMO", and a positive electrode (cathode) active material for lithium secondary batteries is hereinafter referred to as "CAM".

<LiMO>

The present embodiment relates to a LiMO having a layered structure.

The LiMO of the present embodiment contains at least lithium, nickel and an element X.

The element X is at least one element selected from the group consisting of Co, Mn, Fe, Cu, Ti, Mg, Al, W, Mo, Nb, Zn, Sn, Zr, Ga, V, B, Si, S and P.

The LiMO of the present embodiment includes single particles.

The designations and definitions of particles in the present embodiment are explained below.

[Primary Particles]

In the present embodiment, the primary particles are defined as follows.

The primary particles are particles having no grain boundaries in appearance. Primary particles are categorized into particles that constitute secondary particles and particles that do not form secondary particles and exist independently.

The particle size of the primary particles is, for example, 0.1 μm or more and 10 μm or less.

The primary particles constituting the secondary particles are not ones that have grown to have a large particle size, and the particle size thereof is, for example, 0.1 μm or more and less than 0.5 μm.

The particle size of particles that exist independently without forming secondary particles is, for example, 0.3 μm or more and 10 μm or less.

It is preferable that the primary particles that exist independently without forming secondary particles include single particles. The "single particle" is a primary particle that exists independently without forming secondary particles and has a particle diameter of 0.5 μm or more.

The particle size of the single particle is, for example, 0.5 μm or more and 10 μm or less.

[Secondary Particles]

In the present embodiment, the secondary particles are aggregates of primary particles.

In the context of the present specification, the term "aggregation" means that the primary particles are three-dimensionally integrated with each other, contacting at may positions, to form larger particles.

The particle size of the secondary particles is, for example, 5 μm or more and 30 μm or less.

In the present embodiment, with respect to the particles contained in the LiMO, the ratio of the number of single particles to the total number of secondary particles and primary particles existing independently without forming secondary particles is preferably 20% or more, more preferably 30% or more, and particularly preferably 50% or more. The upper limit is not particularly limited, but is 100% or less, preferably 90% or less. The above ratio of the number of single particles is preferably 20% or more and 100% or less, more preferably 30% or more and 90% or less, and still more preferably 50% or more and 90% or less.

In the present embodiment, with respect to the particles contained in the LiMO, the ratio of the number of single particles to the total number of secondary particles and primary particles existing independently without forming secondary particles is determined by the following method.

First, LiMO is placed on a conductive sheet attached on a sample stage, and the primary particles and the secondary particles which are aggregates of the primary particles are allowed to disperse so as to exist independently without contacting each other.

Then, a SEM observation is implemented while irradiating the LiMO with an electron beam with an accelerated voltage of 20 kV using a scanning electron microscope (SEM, JSM-5510, manufactured by JEOL Ltd.).

Next, 200 particles are randomly extracted from the image (SEM photograph) obtained by the SEM observation, and defined as the total number of the secondary particles and the primary particles.

Next, the number of single particles included in the extracted 200 particles is calculated. The method for extracting single particles is described in a later section.

By dividing the obtained number of single particles by the total number of secondary particles and primary particles and multiplying by 100, the ratio of the number of single particles to the total number of secondary particles and primary particles is calculated.

The magnification of the SEM photograph is not limited as long as the photograph allows identification of the particle morphology of the target LiMO, and is preferably 1000 times or more and 30,000 times or less.

In the context of the present specification, the "adhered fine particles" are fine particles adhering to the surface of a single particle.

The adhered fine particles contain at least lithium and nickel. The adhered fine particles are crystalline or amorphous particles that are generated by, for example, breakage of primary particles and adhere to the surface of single particles. The maximum particle size of the adhered fine particles is preferably 0.067 to 0.5 times.

The LiMO of the present embodiment satisfies all of the following requirements (1) to (5). Hereinbelow, the respective requirements are described.

<<Requirement (1)>>

The LiMO of the present embodiment has a volume-based 50% cumulative particle size $D_{50}$ of 2 μm or more and 10 μm or less.

The lower limit of $D_{50}$ may be, for example, 2.1 μm, 2.5 μm, or 3.0 μm.

The upper limit of $D_{50}$ may be, for example, 9.0 μm, 8.0 μm, or 7.0 μm.

The above-described upper limit values and lower limit values of $D_{50}$ can be combined in any manner. Examples of the combination include 2.1 μm or more and 9.0 μmor less; 2.5 μm or more and 8.0 μm or less; 2 μm or more and 7 μm or less; and 3.0 μm or more and 7.0 μm or less.

In the present embodiment, $D_{50}$ can be measured by the following method.

First, 0.1 g of the LIMO powder to be measured is put into 50 ml of 0.2% by mass aqueous sodium hexametaphosphate solution to obtain a dispersion liquid in which the LiMO powder is dispersed.

The obtained dispersion is subjected to a particle size distribution measurement using a laser diffraction scattering particle size distribution measuring apparatus, whereby the volume-based cumulative particle size distribution curve is obtained.

In the cumulative particle size distribution curve obtained, the volume-based particle size at 50% cumulation is defined as $D_{50}$, i.e., volume-based 50% cumulative particle size, of LiMO.

As the laser diffraction scattering particle size distribution measuring apparatus, for example, Mastersizer 2000, manufactured by Malvern Panalytical Ltd. can be used.

The LiMO of the present embodiment that satisfies the requirement (1) has an improved contact area with a conductive material and an electrolytic solution. Therefore, the desorption, movement, and insertion of lithium ions on the surface of LiMO are facilitated, and the resistance associated with the movement of electrons is reduced. As a result, the charge transfer resistance on the surface of the LiMO particles can be reduced.

<<Requirement (2)>>

In the LiMO of the present embodiment, the single particles have, on at least a part of surfaces thereof, adhered fine particles, with the proviso that a maximum particle size of the adhered fine particles is smaller than a particle size of the single particles. The method for measuring the maximum particle size of the adhered fine particles and the particle size of the single particles are described in a later section.

In the present embodiment, it is preferable that the adhered fine particles are adhered to a part of the surfaces of the single particles in a non-sintered state. That is, it is preferable that the single particles and the adhered fine particles are in the form of a complex where the single particles and the adhered fine particles are in contact with each other without being fused together by sintering.

In the present embodiment, confirmation of the non-sintered mutual integration between the single particles and the adhered fine particles can be implemented by confirming that the adhered fine particles are removed by, for example, washing the LiMO with water. When the adhered fine particles are removed by washing the LiMO with water, it can be judged that the single particles and the adhered fine particles are integrated with each other in a non-sintered state.

Specifically, for the LiMO before and after washing with water, the average number of adhered fine particles adhered to one single particle described later is calculated. When the value obtained by dividing the average number after washing the LiMO with water by the average number before washing the LiMO with water is 0.10 or less, it can be judged that the single particles and the adhered fine particles are integrated with each other in a non-sintered state.

The surface of the single particle has a section free of the adhered fine particles, where the surface of the single particle is exposed.

It is preferable that the adhered fine particles exist independently on the surface of the single particle without being adjacent to each other. That is, it is preferable that the adhered fine particles are adhered to the surface of the single particles while being separated from each other. That is, it is preferable that the adhered fine particles are not aggregated or are not in the form of clusters.

The single particle having adhered fine particles, which satisfies the requirement (2), has an increased surface area. This enables the LiMO to have a larger area of contact with the conductive material or the electrolytic solution. Therefore, desorption, movement and insertion of lithium ions are facilitated on the surface of the LiMO particles.

As a result, the resistance associated with the movement of electrons on the surface of the LiMO particles is reduced.

Thus, the charge transfer resistance on the surface of the LiMO particles can be reduced.

The adhesion of the adhered fine particles to a part of the surface of the single particle can be confirmed by observation using a scanning electron microscope (SEM).

Figure 2:
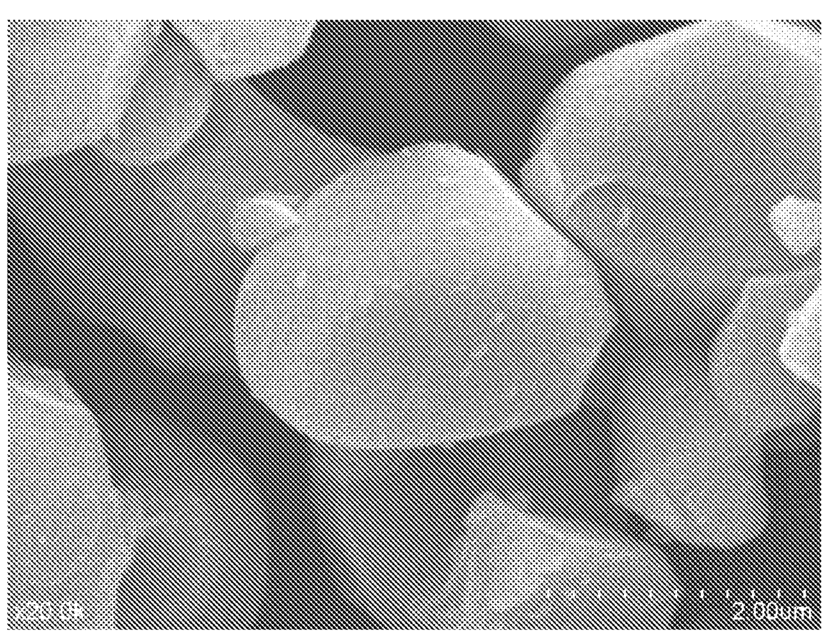
FIG. 2 is a SEM photograph of single particles contained in the lithium metal composite oxide of the present embodiment.

A SEM image of an example of single particles contained in the LiMO of the present embodiment is shown in FIG. 2. The magnification of the SEM image shown in FIG. 2 is 20000 times.

As shown in FIG. 2, the single particles contained in the LiMO of the present embodiment includes adhered fine particles on a part of the surfaces of the single particles. On the surfaces of the single particles shown in FIG. 2, the adhered fine particles do not aggregate and exist independently without being adjacent to each other.

In the LiMO of the present embodiment, the ratio of the number of single particles having the adhered fine particles on the surfaces thereof is preferably 70% or more, more preferably 80% or more, and particularly preferably 90% or more, and may be 100%, of the total number of single particles contained in the LiMO. The ratio of the number of single particles having the adhered fine particles on the surfaces thereof is, for example, preferably 70% or more and 100% or less, more preferably 80% or more and 100% or less, and even more preferably 90% or more and 100% or less.

As for the ratio of the number of single particles having the adhered fine particles on the surfaces thereof, this ratio can be determined by randomly extracting 100 single particles by the same method as in the above-mentioned method for measuring the ratio of the number of single particles, counting the number of single particles having adhered fine particles, which are included in the randomly selected 100 single particles, dividing the number of single particles having the adhered fine particles by 100, and multiplying by 100.

<<Requirement (3)>>

In the LiMO of the present embodiment, the particle size of the single particles is 0.2 to 1.5 times the Ds) of the LiMO. The particle size of the single particles is preferably not less than 0.3 times, more preferably not less than 0.4 times, and particularly preferably not less than 0.5 times the $D_{50}$ of the LiMO. The particle size of the single particles is preferably not more than 1.4 times, more preferably not more than 1.3 times, and particularly preferably not more than 1.2 times the $D_{50}$ of the LiMO.

The above upper limit values and lower limit values can be combined in any manner.

Examples of the combination include: 0.3 times or more and 1.4 times or less; 0.4 times or more and 1.3 times or less; and 0.5 times or more and 1.2 times or less, each relative to the $D_{50}$ of LiMO.

A single particle satisfying the requirement (3) can have a plurality of the adhered fine particles adhered to the surface of the single particle. Therefore, the surface area of the single particle containing the adhered fine particles increases. This enables the LiMO to have a larger area of contact with the conductive material or the electrolytic solution. Therefore, desorption, movement and insertion of lithium ions are facilitated on the surface of the LiMO particles. As a result, the resistance associated with the movement of electrons on the surface of the LiMO particles is reduced. As a result, the charge transfer resistance on the surface of the LiMO particles can be reduced.

In the present embodiment, the particle size of the single particles can be measured by the following method.

First, the LiMO of the present embodiment is placed on a conductive sheet affixed on a sample stage. Then, an observation is implemented while irradiating the LiMO with an electron beam with an accelerated voltage of 20 kV using a scanning electron microscope.

As the scanning electron microscope, for example, JSM-5510, manufactured by JEOL Ltd., can be used.

Then, 50 to 98 single particles are extracted from the obtained electron microscope image (SEM photograph) by the following method. For example, 50 single particles may be extracted.

(Single Particle Extraction Method)

When measuring the particle size of the single particles, the single particles included in one field of view are the measurement target. When the number of single particles contained in one field of view is less than 50, the number of field of view is increased until 50 or more single particles are secured as the measurement target.

As regards a selection criterion for single particles to be measured, particles having a particle diameter of 0.5 μm or more and existing independently are subjected to the measurement. With respect to the image of the particle, parallel lines are drawn from a certain direction so as to sandwich the image of the particle, and the distance between the parallel lines (Feret diameter) is measured. In terms of this Feret diameter, primary particles each having a maximum value (maximum diameter) of 0.5 μm or more are selected as single particles.

In the case where the single particles appear to be simply overlapping in the observed field of view, seemingly without forming secondary particles by aggregation, the single particle in the foreground may be selected as the measurement target.

Further, when two or more single particles are connected in the observed field of view and the boundary between the single particles is clear, each of the single particles may be regarded as the measurement target assuming that the two or more single particles are in contact with each other.

With respect to the image of the extracted single particle, parallel lines are drawn from a certain direction so as to sandwich the image of the single particle, and the distance between the parallel lines (Feret diameter) is measured. In terms of this Feret diameter, the maximum value (maximum diameter) for each single particle is regarded as the particle size of the single particle. The obtained particle size can be used as the particle size of the single particles in the above requirements (2) and (3).

The arithmetic mean value of the particle sizes thus obtained for the single particles is the average particle size of the single particles contained in the LiMO. The average particle size of the obtained single particles may be used as the particle size of the single particles in the above requirements (2) and (3).

<<Requirement (4)>>

In the LiMO of the present embodiment, the particle size of the adhered fine particles is 0.01 to 0.1 times the $D_{50}$ of the LiMO. The particle size of the adhered fine particles is preferably not less than 0.02 times, more preferably not less than 0.03 times, and particularly preferably not less than 0.04 times the $D_{50}$ of the LiMO. The particle size of the adhered fine particles is preferably not more than 0.09 times, more preferably not more than 0.08 times, and particularly preferably not more than 0.07 times the $D_{50}$ of the LiMO. The above upper limit values and lower limit values can be combined in any manner.

Examples of the combination include not less than 0.02 times and not more than 0.09 times; not less than 0.03 times and not more than 0.08 times; and not less than 0.04 times and not more than 0.07 times the $D_{50}$ of the LIMO. The method for measuring the particle size of the adhered fine particles is described in a later section.

The adhered fine particles are fine particles adhering to the surface of the single particle. The adhered fine particles encompass primary particle-type adhered fine particles that exist independently, and secondary particle-type adhered fine particles that are aggregates of fine particles.

When the measurement target is secondary particle-type adhered fine particles, the particle size of the aggregates is measured as the particle size of the adhered fine particles.

Further, when two or more primary particle-type adherent fine particles in the observed field of view are connected and the boundary between the primary particles is clear, the primary particle-type adherent fine particles are regarded as the measurement target assuming that the two or more primary particle-type adherent fine particles are in contact with each other.

With respect to the adhered fine particles with a particle size less than the lower limit of the requirement (4), the increase in surface area by the adhesion per fine particle is small. This presumably reduces the effect of increasing the area of contact between the LiMO and the conductive material or the electrolytic solution. That is, the fine particles with a particle size not less than the lower limit of the requirement (4) provide a large increase in surface area by the adhesion per fine particle. Therefore, such particles presumably enhances the effect of increasing the area of contact between the LiMO and the conductive material or the electrolytic solution.

The adhered fine particles with a particle size exceeding the upper limit of the requirement (4) have a small contact area with the single particle relative to the volume of the fine particles. This presumably makes it more difficult for the fine particles to adhere to the surface of the single particle, and facilitates detachment of the adhered fine particles by impact or the like. That is, the adhered fine particles with a particle size not more than the upper limit of the requirement (4) have a large contact area with the single particles relative to the volume of the fine particles. This presumably facilitates adhesion of the fine particles to the surface of the single particle, and prevents detachment of the adhered fine particles by impact or the like.

<<Requirement (5)>>

In the LiMO of the present embodiment, the average number of the adhered fine particles adhered per particle of the single particles is 1 or more and 30 or less, preferably 2 or more and 25 or less, more preferably 3 or more and 20 or less, and particularly preferably 4 or more and 15 or less as measured with respect to a range observable in an image obtained by a scanning electron microscope.

The average number of the adhered fine particles adhered per particle of the single particles can be calculated by the following method.

First, the LiMO of the present embodiment is placed on a conductive sheet affixed on a sample stage.

Then, observation is implemented with a scanning electron microscope. In this process, an electron beam is irradiated and observation is implemented with respect to a field of view with 10,000 times magnification.

Among the single particles extracted in the extraction of the single particles described above, the single particles to be measured are those with a particle diameter which is 0.2 to 1.5 times the $D_{50}$ of the LiMO.

The adhered fine particles present on the surface of the single particle as the measurement target are counted. Thus, the number of adhered fine particles adhered to the surface of one single particle can be determined.

The adhered fine particles as the measurement target have a smaller particle size than the single particles on which the fine particles are adhered, and are fine particles having a particle size which is 0.01 to 0.1 times the $D_{50}$ of the LiMO in the field of observation described above.

In this context, the particle size of the adhered fine particles is defined as the distance (Feret diameter) between the parallel lines drawn from a certain direction so as to sandwich an image of the single particle. For example, with respect to the image of the adhered fine particle, parallel lines are drawn from a certain direction so as to sandwich the image of the particle, and the distance between the parallel lines (Feret diameter) is measured to determine the maximum value (maximum size) of this distance for the adhered fine particle. This maximum value (maximum size) can be used as the particle size of the adhered fine particle. Among the adherent fine particles included in one single particle, the particle size of the adhered fine particles having the largest particle size is the maximum particle size of the adhered fine particles in the above requirement (2).

The surface of a single particle refers to the surface region of the single particle that is visually recognizable in the observation field of view. In the present embodiment, a region that is not visually recognizable in the SEM observation is not taken into consideration. A region that is not visually recognizable in the SEM observation is, for example, the back side of the single particle or a portion that is behind another single particle.

The same measurement is performed for 30 single particles, and the average number of adhered fine particles present on the surfaces of the single particles obtained by dividing the total number of the measured fine particles by 30 is regarded as an average number of the adhered fine particles adhered per particle of the single particles. It is preferable that the above requirements (2) and (4) are satisfied by all of the 30 single particles.

When the average number of adhered fine particles adhered per particle of the single particles is within the range satisfying the above requirement (5), it is assumed that the contact area between the LiMO and the conductive material or the electrolytic solution increases. Therefore, the desorption, movement, and insertion of lithium ions on the surface of the LiMO are facilitated, and the charge transfer resistance can be reduced.

When the average number of adhered fine particles adhered per particle of the single particles is less than the lower limit of the above requirement (5), the surface area of the single particles having the adhered fine particles becomes small, and the contact area between the LiMO and the conductive material or the electrolytic solution decreases. Therefore, the resistance associated with the movement of electrons tends to increase. That is, when the average number of adhered fine particles adhered per particle of the single particles is not less than the lower limit of the above requirement (5), the surface area of the single particles having the adhered fine particles becomes large, and the contact area between the LiMO and the conductive material or the electrolytic solution increases. Therefore, the resistance associated with the movement of electrons tends to decrease.

When the average number of adhered fine particles adhered per particle of the single particles exceeds the upper limit of the above requirement (5), it is assumed that the adhered fine particles are partially adjacent to each other on the surfaces of the single particle to form a layer of the adhered particles. When a layer of the adhered fine particles is formed, the resistance between the adhered fine particles included in the layer increases. Therefore, the desorption, movement, and insertion of lithium ions on the surface of the LiMO are less likely to occur. This results in the increase in the resistance associated with the movement of electrons, and the increase in the charge transfer resistance. That is, when the average number of adhered fine particles adhered per particle of the single particles is not more than the upper limit of the above requirement (5), it is assumed that a layer of the adhered fine particles which are partially adjacent to each other on the surfaces of the single particle is not likely to be formed. Therefore, the desorption, movement, and insertion of lithium ions on the surface of the LiMO are facilitated. This results in the decrease in the resistance associated with the movement of electrons, and the decrease in the charge transfer resistance.

<<Coating Material>>

The LiMO of the present embodiment preferably has a coating material. More specifically, it is preferable that the LiMO particles, as core particles, have a coating material covering the core particles. The core particles encompass: primary particles (including single particles having no adhered fine particles and single particles having the adhered fine particles) which exist independently without forming secondary particles; and secondary particles.

In the present embodiment, the coating material is preferably a coating layer or coating particles.

In the LiMO of the present embodiment, the element represented by X may constitute or form a part of the core particle or the coating material.

Among the elements represented by X, the element constituting or forming a part of the coating material is referred to as element M. The element M is preferably at least one element selected from the group consisting of P, B, Al, Ti, Zr, La, Nb and W. and is more preferably at least one element selected from the group consisting of P, B, Al, Zr, Nb and W. The coating material preferably includes a lithium-containing composite oxide of Li and the element M.

The element M and the element X may be the same or different. From the perspective of efficient production, it is preferable that the element M and the element X are the same.

In the LIMO of the present embodiment, the ratio (M/(Ni+X)) of number of moles of the element M contained in the coating material to the sum of number of moles of nickel and the element X is 0.05 mol % or more and 5 mol % or less.

The ratio (M/Ni+X) is more preferably 4 mol % or less, and particularly preferably 3 mol % or less. The ratio (M/Ni+X) is more preferably 0.1 mol % or more, and particularly preferably 1 mol % or more. The above upper limit values and lower limit values can be combined in any manner.

Examples of the combination include 0.1 mol % or more and 4 mol % or less; and 1 mol % or more and 3 mol % or less.

In the present embodiment, the confirmation of the composition of the coating material can be carried out by analyzing the cross-section of the LiMO particle having the coating material by STEM-EDX elemental line analysis, inductively coupled plasma atomic emission spectrophotometry, electron probe microanalysis and the like.

In the present embodiment, it is preferable that the coating material does not contain Ni. The LiMO and the coating material can be distinguished from each other in terms of the presence or absence of Ni, and the respective compositions thereof can be analyzed.

The confirmation of the crystal structure of the coating material can be carried out by analyzing the LiMO particle having the coating material by way of powder X-ray diffractometry, electron beam diffractometry or the like.

The LiMO of the present embodiment is preferably represented by the following composition formula (A):

$$Li[Li_m(Ni_{(1-n)}X_n)_{1-m}]O_2 \quad (A)$$

wherein: X is at least one element selected from the group consisting of Co, Mn, Fe, Cu, Ti, Mg, Al, W, Mo, Nb, Zn, Sn, Zr, Ga, V, B, Si, S and P; m and n satisfy $-0.1 \le m \le 0.2$, $0<n \le 0.6$ and $0<m+n<0.6$.

For obtaining a lithium secondary battery with good cycle performance, m in the composition formula (A) is preferably more than 0, more preferably 0.01 or more, even more preferably 0.02 or more. Further, for obtaining a lithium secondary battery with higher initial Coulombic efficiency, m in the composition formula (A) is preferably 0.1 or less, more preferably 0.08 or less, and even more preferably 0.06 or less.

The above upper limit values and lower limit values of m can be combined in any manner.

In the present embodiment, $0<m \le 0.2$ is preferable, and $0<m \le 0.1$ is more preferable.

For obtaining a lithium secondary battery having a high discharge capacity, n in the composition formula (A) is preferably 0.55 or less, more preferably 0.5 or less, even more preferably 0.45 or less, and particularly preferably 0.2 or less. Further, n is preferably more than 0, more preferably 0.05 or more, even more preferably 0.10 or more, and particularly preferably 0.12 or more.

The upper limit values and lower limit values of n can be combined in any manner.

Examples of the combination include more than 0 and 0.55 or less; 0.05 or more and 0.5 or less; 0.10 or more and 0.45 or less; and 0.12 or more and 0.2 or less.

In the LiMO of the present embodiment, the nickel content (Ni/(Ni+X)), in terms of a molar ratio relative to a total amount of nickel and the element X, is preferably 0.4 or more, more preferably 0.45 or more, even more preferably 0.50 or more, and particularly preferably 0.55 or more. The upper limit of (Ni/(Ni+X)) is not particularly limited, and may be, for example, 0.95, 0.90, or 0.80. The above upper limit values and lower limit values can be combined in any manner.

Examples of the combination include 0.45 or more and 0.95 or less; 0.50 or more and 0.90 or less; and 0.55 or more and 0.80 or less.

In the present embodiment, the composition analysis of the LiMO is carried out using an ICP emission spectrophotometer (SPS3000 manufactured by SII Nanotechnology Inc.) after a LiMO powder is dissolved in hydrochloric acid.

In the present embodiment, the BET specific surface area of the LiMO is preferably 2 $m^2/g$ or less, more preferably 1.5 $m^2/g$ or less, and particularly preferably 1 $m^2/g$ or less.

The lower limit of the BET specific surface area may be, for example, 0.1 $m^2/g$, 0.2 $m^2/g$, or 0.3 $m^2/g$.

The above upper limit values and lower limit values can be combined in any manner.

Examples of the combination include 0.1 $m^2/g$ or more and 2 $m^2/g$ or less; 0.2 $m^2/g$ or more and 1.5 $m^2/g$o r less; and 0.3 $m^2/g$ or more and 1 $m^2/g$ or less.

The BET specific surface area (unit: $m^2/g$) can be measured by a BET specific surface area measuring device after drying 1 g of the LiMO in a nitrogen atmosphere at 105° C. for 30 minutes.

As the BET specific surface area measuring device, for example, Macsorb (registered trademark) manufactured by Mountech Co., Ltd. can be used.

(Layered Structure)

In the present embodiment, the crystal structure of LiMO is a layered structure, and is more preferably a hexagonal crystal structure or a monoclinic crystal structure.

The hexagonal crystal structure belongs to any one of the space groups selected from the group consisting of P3, $P3_1$, $P3_2$, R3, P-3, R-3, P312, P321, $P3_112$, $P3_121$, $P3_212$, $P3_221$, R32, P3m1, P31m, P3c1, P31c, R3m, R3c, P-31m, P-31c, P-3m1, P-3c1, R-3m, R-3c, P6, $P6_1$, $P6_5$, $P6_2$, $P6_4$, $P6_3$, P-6, P6/m, $P6_3/m$, P622, $P6_122$, $P6_522$, $P6_222$, $P6_422$, $P6_322$, P6mm, P6cc, $P6_3cm$, $P6_3mc$, P-6m2, P-6c2, P-62m, P-62c, P6/mmm, P6/mcc, $P6_3/mcm$, and $P6_3/mmc$.

The monoclinic crystal structure belongs to any one of the space groups selected from the group consisting of P2, $P2_1$, C2, Pm, Pc, Cm, Cc, P2/m, $P2_1/m$, C2/m, P2/c, $P2_1/c$, and C2/c.

Among the aforementioned crystal structures, for obtaining a lithium secondary battery having high discharge capacity, the particularly preferable crystal structure of the positive electrode active material is a hexagonal crystal structure belonging to R-3m or a monoclinic crystal structure belonging to C2/m.

The crystal structure of the LiMO can be confirmed by analyzing the LiMO powder through X-ray diffractometry.

<Method for Producing LiMO>

A method for producing LiMO according to the present embodiment is described below.

The LiMO production method of the present embodiment includes the following steps (A) and (B) to be implemented in this order, and preferably further includes a [step of producing a precursor of LiMO] before the step (A):

- step (A) of calcining a mixture of a composite compound containing at least nickel (nickel-containing MCC), and a lithium compound containing a lithium element, thereby obtaining a calcined product; and
- step (B) of crushing the obtained calcined product to obtain a LiMO.

[Step of Producing Precursor of LiMO]

First, it is preferable to produce a precursor of LiMO. The precursor of LiMO is a nickel-containing MCC containing metals other than lithium out of the metals constituting the target LiMO; that is, the precursor contains nickel and the element X.

As the nickel-containing MCC serving as a precursor, a nickel-containing metal composite hydroxide or a nickel-containing metal composite oxide can be used.

The precursor can be produced by a commonly known coprecipitation method. As the coprecipitation method, a batch coprecipitation method or a continuous coprecipitation method can be used.

Hereinbelow, a method for producing a precursor is described in detail, using as an example a nickel-cobalt-manganese metal composite hydroxide (hereinafter, also referred to as "metal composite hydroxide") containing nickel and, as the element X, cobalt and manganese.

First, a nickel salt solution, a cobalt salt solution, a manganese salt solution and a complexing agent are reacted by the co-precipitation method, especially, a continuous method described in JP-A-2002-201028 to produce a metal composite hydroxide represented by $Ni_sCo_tMn_u(OH)_2$, wherein s+t+u=1.

Although there is no particular limitation with respect to a nickel salt as a solute in the above nickel salt solution, for example, any one or more of nickel sulfate, nickel nitrate, nickel chloride and nickel acetate can be used.

As a cobalt salt as a solute in the above cobalt salt solution, for example, any one or more of cobalt sulfate, cobalt nitrate, cobalt chloride and cobalt acetate can be used.

As a manganese salt as a solute in the above manganese salt solution, for example, any one or more of manganese sulfate, manganese nitrate, manganese chloride and manganese acetate can be used.

These metal salts are used in a ratio corresponding to the composition ratio of the aforementioned $Ni_sCo_tMn_u(OH)_2$. That is, the metal salts are used in such amounts that allow the molar ratios of nickel in the solute of the nickel salt solution, cobalt in the solute of the cobalt salt solution and manganese in the solute of the manganese salt solution to correspond to the composition ratio s:t:u of the $Ni_sCo_tMn_u(OH)_2$.

Further, the solvent for the nickel salt solution, cobalt salt solution and manganese salt solution is water. That is, the nickel salt solution, the cobalt salt solution, and the manganese salt solution are aqueous solutions.

The complexing agent is a compound capable of forming a complex with nickel ions, cobalt ions and manganese ions in an aqueous solution.

Examples of the complexing agent include an ammonium ion donor (such as ammonium sulfate, ammonium chloride, ammonium carbonate and ammonium fluoride), hydrazine, ethylenediaminetetraacetic acid, nitrilotriacetic acid, uracildiacetic acid and glycine.

A complexing agent may or may not be used in the step for producing a precursor.

When a complexing agent is used, the amount of the complexing agent contained in a mixture solution containing the nickel salt solution, the salt solution of the element X and the complexing agent is preferably, for example, more than 0 and 2.0 or less in terms of a molar ratio with respect to the total number of moles of the nickel salt and the salt of the element X.

In the present embodiment, the amount of the complexing agent contained in a mixture solution containing the nickel salt solution, the cobalt salt solution, the manganese salt solution and the complexing agent is preferably, for example, more than 0 and 2.0 or less in terms of a molar ratio with respect to the total number of moles of the metal salts.

In the coprecipitation method, in order to adjust the pH value of the mixture solution containing the nickel salt solution, the salt solution of the element X and the complexing agent, an alkali metal hydroxide is added to the mixture solution before the pH of the mixture solution changes from alkaline to neutral. The alkali metal hydroxide may be, for example, sodium hydroxide or potassium hydroxide.

In the context of the present specification, the pH value is defined as a value measured when the temperature of the mixture solution is 40° C. The pH of the mixture solution is measured when the temperature of the mixture solution sampled from the reaction vessel reaches 40° C.

During the reaction, the temperature of the reaction vessel is controlled within a range of, for example, 20° C. or higher and 80° C. or lower, and preferably 30° C. or higher and 70° C. or lower.

The pH value in the reaction vessel is set within the range of, for example, pH 9 or more and pH 13 or less, and preferably pH 10 or more and pH 12.5 or less, when the temperature of the aqueous solution is 40° C. The pH is controlled within ±0.5.

The materials in the reaction vessel are mixed by appropriately stirring.

With respect to the reaction vessel used in the continuous coprecipitation method, one which allows the overflow for separation of the precipitated reaction product can be used.

The atmosphere inside the reaction vessel may be an inert atmosphere. The inert atmosphere inside the reaction vessel prevents the metals contained in the mixture solution that are more easily oxidized than nickel from aggregating before aggregation of nickel. Therefore, a uniform metal composite hydroxide can be obtained.

Alternatively, the atmosphere inside of the reaction vessel may be a moderately oxidizing atmosphere. The oxidizing atmosphere may be an oxygen-containing atmosphere in which an oxidizing gas is mixed with an inert gas. Another option is to allow an oxidizing agent to be present in an inert gas atmosphere. The moderately oxidizing atmosphere inside the reaction vessel allows the transition metal contained in the mixture solution to be moderately oxidized, and makes it easier to control the morphology of the metal composite oxide.

With respect to the oxygen or oxidizing agent in the oxidizing atmosphere, there is not particular limitation as long as it can provide sufficient oxygen atoms to oxidize the transition metals.

When the oxidizing atmosphere is an oxygen-containing atmosphere, the atmosphere in the reaction vessel can be controlled by allowing the oxidizing gas to pass through the reaction vessel, bubbling the oxidizing gas into the mixture solution, or the like.

The above reaction is followed by isolating the precursor from the obtained reaction precipitate, washing, and subsequent drying to obtain a nickel-cobalt-manganese metal composite hydroxide as the precursor.

Further, if simple washing of the reaction precipitate with water allows impurities derived from the mixed solution to remain, the reaction precipitate may be washed with a weak acid water or an alkaline solution, if necessary. Examples of the alkaline solution include an aqueous solution containing sodium hydroxide or potassium hydroxide.

For isolating the nickel-cobalt-manganese metal composite hydroxide as a precursor, it is preferable to adopt a method that dehydrates a slurry (coprecipitated slurry) containing a reaction precipitate by centrifugation, suction filtration or the like.

The drying time is preferably 1 hour or more and 30 hours or less in total from the start of temperature increase to the end of temperature maintenance. The rate of temperature increase in the heating step to reach the maximum holding temperature is preferably 180° C./hour or more, more preferably 200° C./hour or more, and particularly preferably 250° C./hour or more.

The maximum holding temperature in the context of the present specification is the maximum holding temperature of the atmosphere in the drying furnace or the calcination furnace (hereinafter, also collectively referred to as "heating device") in the drying step or the calcination step described later (hereinafter, also collectively referred to as "heating step"), and means the temperature in the heating step. In the case of a calcination step having a plurality of heating steps, the maximum holding temperature means the maximum temperature among the temperatures in the heating steps.

The heating rate in the context of the present specification is calculated from the time elapsed from the onset of temperature increase up to the time of reaching the maximum holding temperature in the heating device, and the temperature difference between the temperature at the onset of the temperature increase and the maximum holding temperature in the calcination furnace of the heating device.

The drying conditions are not particularly limited, and examples thereof include any of the following drying conditions 1) to 3).

1) A condition in which the precursor is not oxidized or reduced.

More specifically, it is a drying condition that allows an oxide to remain as an oxide, or a drying condition that allows a hydroxide to remain as a hydroxide.

2) A condition in which the precursor is oxidized.

More specifically, it is a drying condition for oxidation from a hydroxide to an oxide.

3) A condition in which the precursor is reduced.

More specifically, it is a drying condition for reduction from an oxide to a hydroxide.

The drying conditions 1) to 3) may be appropriately selected depending on whether the nickel-containing MCC to be produced is either a nickel-containing metal composite hydroxide or a nickel-containing metal composite oxide.

For providing a condition that does not oxidize or reduce the precursor, an inert gas such as nitrogen, helium and argon may be used. Under the condition that oxidizes the hydroxide, oxygen or air may be used.

Further, as a condition that reduces the precursor, a reducing agent such as hydrazine or sodium sulfite may be used under an inert gas atmosphere.

After drying the precursor, classification may be performed as appropriate.

In the above example, a nickel-cobalt-manganese metal composite hydroxide is produced; however, a nickel-cobalt-manganese metal composite oxide may be produced instead. For preparing the nickel-cobalt-manganese-metal composite oxide, for example, a method that subjects the nickel-cobalt-manganese-metal composite hydroxide to a heat treatment can be adopted.

Step for Crushing Precursor

In the present embodiment, the produced precursor may be crushed. By this process, a powdery precursor can be obtained.

The step for crushing the precursor is preferably carried out by a roll mill, a disc mill, a pin mill, a ball mill, a jet mill, or a counter jet mill equipped with a classification rotor.

[Step (A)]

This step is a step of calcining a mixture of a composite compound containing at least nickel, and a lithium compound containing a lithium element, thereby obtaining a calcined product.

Lithium Compound Containing Lithium Element

As the lithium compound used in the present embodiment, a mixture of any one of lithium carbonate, lithium nitrate, lithium acetate, lithium hydroxide, lithium oxide, lithium chloride and lithium fluoride, or mixture thereof can be used. Among these, either one or both of lithium hydroxide and lithium carbonate is preferable.

When the lithium hydroxide contains lithium carbonate as an impurity, the lithium carbonate content in the lithium hydroxide is preferably 5% by mass or less.

A method for mixing the above precursor and the above lithium compound is described below.

The precursor obtained by the above method is mixed with a lithium compound.

The above lithium compound and the precursor are mixed in consideration of the composition ratio of the final target product.

For example, when using a nickel-cobalt-manganese composite hydroxide, the lithium compound and the nickel-cobalt-manganese metal composite hydroxide are mixed with a ratio corresponding to the composition ratio of $[Li_r(Ni_sCo_tMn_u)_{1-r}]O_2$ (wherein, s+t+u=1). By calcining the mixture of the nickel-cobalt-manganese composite hydroxide and the lithium compound in the subsequent calcination step, a lithium-nickel-cobalt-manganese composite oxide can be obtained.

In order to obtain a uniform lithium-nickel-cobalt-manganese metal composite oxide, r is preferably more than 0, more preferably 0.01 or more, even more preferably 0.02 or more. Further, for obtaining a high-purity lithium-nickel-cobalt-manganese metal composite oxide, r is preferably 0.1 or less, more preferably 0.08 or less, and even more preferably 0.06 or less.

The upper limit values and lower limit values of r can be combined in any manner.

For example, the combination of the upper limit values and lower limit values of r is preferably more than 0 and 0.1 or less, more preferably 0.01 or more and 0.08 or less, and even more preferably 0.02 or more and 0.06 or less.

Step of Calcining Mixture to Obtain Calcined Product

This step is a step of calcining a mixture of a lithium compound and a precursor to obtain a calcined product.

The calcination may be carried out in dried air, an oxygen atmosphere, an inert atmosphere or the like depending on the desired composition, and may include a plurality of calcination steps if necessary.

By adjusting the maximum holding temperature in the calcination, the obtained LiMO can be controlled to fall within the range of the above requirement (1).

Generally, as the maximum holding temperature increases, the single particle diameter tends to increase. The maximum holding temperature during calcination may be appropriately adjusted depending on the type of transition metal element to be used and the types and amounts of precipitant and inert melting agent described later.

In the present embodiment, specifically, the maximum holding temperature may be set within the range of 200° C. or higher and 1,150° C. or lower, preferably 3X0° C. or higher and 1,050° C. or lower, and more preferably 500° C. or higher and 1,000° C. or lower. When calcining the mixture in the presence of the inert melting agent described later, the maximum holding temperature may be set in consideration of the melting point of the inert melting agent, and is preferably set within a range of the melting point of the inert melting agent minus 200° C. or higher and the melting point of the inert melting agent plus 200° C. or lower.

By adjusting the holding time in the calcination step, the obtained LiMO can be controlled to fall within the range of the requirement (1). The holding time in the calcination step may be appropriately adjusted depending on the type of transition metal element to be used and the types and amounts of precipitant and inert melting agent.

When the maximum holding temperature is not lower than the above lower limit value, LiMO having a solid crystal structure can be obtained. Further, when the maximum holding temperature is not higher than the above upper limit value, the volatilization of lithium at the surface of the primary particles or the surface of the secondary particles can be reduced.

The calcination step preferably has a plurality of calcination sub-steps with different maximum holding temperatures. For example, it is preferable to provide a first calcination sub-step and a second calcination sub-step of calcining at a higher temperature than the first calcination sub-step. Further, the calcination step may include calcination sub-steps with different maximum holding temperatures and different calcination times.

When the LiMO is represented by the following composition formula (Al), the step (A) is preferably a step (A1) of calcining the mixture at 900° C. or higher to obtain the calcined product:

$$Li[Li_m(Ni_{(1-n)}X_n)_{1-m}]O_2 \quad (A1),$$

wherein: X is at least one element selected from the group consisting of Co, Mn, Fe, Cu, Ti, Mg, Al, W, Mo, Nb, Zn, Sn, Zr, Ga, V, B, Si, S and P; m and n satisfy $0 \le m \le 0.2$, and $0.3 < n \le 0.6$.

When the LiMO is represented by the following composition formula (B1), the step (A) is preferably a step (A1) of calcining the mixture at 900° C. or higher to obtain the calcined product:

$$Li[Li_x(Ni_{(1-y-z-w)}Co_yMn_zM_w)_{1-x}]O_2 \quad (B1),$$

wherein: M is at least one element selected from the group consisting of Fe, Cu, Ti, Mg, Al, W, Mo, Nb, Zn, Sn, Zr, Ga, V, B, Si, S and P; and x, y, z and w satisfy $-0.1 \le x \le 0.2$, $0 \le y \le 0.4, 0 \le z \le 0.4, 0 \le w \le 0.1$, and $0.4 < y+z+w \le 1$.

When the LiMO is represented by the following composition formula (A2), the step (A) is preferably a step (A2) of calcining the mixture at 750° C. or higher to obtain the calcined product:

$$Li[Li_m(Ni_{(1-n)}X_n)_{1-m}]O_2 \quad (A2),$$

wherein: X is at least one element selected from the group consisting of Co, Mn, Fe, Cu, Ti, Mg, Al, W, Mo, Nb, Zn, Sn, Zr, Ga, V, B, Si, S and P; m and n satisfy $0 \le m \le 0.2$, and $0 < n \le 0.3$.

When the LiMO is represented by the following composition formula (B2), the step (A) is preferably a step (A2) of calcining the mixture at 750° C. or higher to obtain the calcined product:

$$Li[Li_x(Ni_{(1-y-z-w)}Co_yMn_zM_w)_{1-x}]O_2 \quad (B2),$$

wherein: M is at least one element selected from the group consisting of Fe, Cu, Ti, Mg, Al, W, Mo, Nb, Zn, Sn, Zr, Ga, V, B, Si, Sand P; and x, y, z and w satisfy $-0.1 \le x \cdot 0.2$, $0 \le y \le 0.4$, $0 \le z \le 0.4, 0 \le w \le 0.1$, and $0 < y+z+w \le 0.4$.

More specifically, the time for holding the above maximum holding temperature may be 0.1 hour or more and 20 hours or less, and is preferably 0.5 hours or more and 10 hours or less. The rate of temperature increase up to the above maximum holding temperature is usually 50° C./hour or more and 400° C./hour or less, and the rate of temperature decrease from the above maximum holding temperature to room temperature is usually 10° C./hour or more and 400° C./hour or less.

In the present embodiment, the rate of temperature increase in the calcination step to reach the maximum holding temperature is preferably 180° C./hour or more, more preferably 200° C./hour or more, and particularly preferably 250° C./hour or more.

The rate of temperature increase in the heating step to reach the maximum holding temperature is calculated from the time elapsed from the onset of temperature increase up to the time of reaching the holding temperature described above in a calcination furnace.

Further, as the atmosphere for calcination, air, oxygen, nitrogen, argon or a mixed gas thereof can be used.

In the present embodiment, the step (A) is preferably a step of calcining in an oxygen atmosphere. When the mixture is continuously supplied into the calcination furnace, the ratio of the oxygen gas supply rate (Nm 3/min) to the supply rate of the mixture (kg/min) (oxygen gas supply rate/mixture supply rate, unit: $Nm^3/kg$) is preferably 20 or less, more preferably 10 or less, and particularly preferably 5 or less.

The lower limit of the ratio is not particularly limited as long as the effect of the present invention can be obtained, and examples thereof include 0.1, 0.3, and 0.5.

The ratio is preferably 0.1 or more and 20 or less, more preferably 0.3 or more and 10 or less, and even more preferably 0.5 or more and 5 or less.

When a predetermined amount of the mixture is calcined, the ratio of the total supply amount of the oxygen gas ($Nm^3$) to the supply amount of the mixture (kg) (total oxygen gas supply amount/mixture supply amount, unit: $Nm^3/kg$) is preferably 20 or less, more preferably 10 or less, and particularly preferably 5 or less.

The lower limit of the ratio is not particularly limited as long as the effect of the present invention can be obtained, and examples thereof include 0.1, 0.3, and 0.5.

The ratio is preferably 0.1 or more and 20 or less, more preferably 0.3 or more and 10 or less, and even more preferably 0.5 or more and 5 or less.

By adjusting the above oxygen/powder ratio in the step (A) to fall within the above range, the resultant product can be controlled to satisfy the requirement (2) to the requirement (5).

In the present embodiment, an inert melting agent may be added to the mixture of the above lithium compound and the precursor to implement the calcination in the presence of the inert melting agent.

The calcination of the mixture implemented in the presence of the inert melting agent can accelerate the reaction of the mixture. The inert melting agent may remain in the calcined product after calcination, or may be removed by washing with a washing liquid or the like after calcination. In the present embodiment, it is preferable to wash LiMO powder after calcination with pure water, an alkaline washing liquid or the like.

The inert melting agent that can be used in the present embodiment is not particularly limited as long as it is unlikely to react with the mixture during calcination. In the present embodiment, examples thereof include at least one selected from the group consisting of a fluoride of one or more elements selected from the group consisting of Na, K, Rb, Cs, Ca, Mg, Sr and Ba (hereinafter referred to as "A"), a chloride of A, a carbonate of A, a sulfate of A, a nitrate of A, a phosphate of A, a hydroxide of A, a molybdate of A and a tungstate of A.

Examples of the fluoride of A include NaF (melting point: 993° C.), KF (melting point: 858° C.), RbF (melting point: 795° C.), CsF (melting point: 682° C.), $CaF_2$ (melting point: 1,402° C.), $MgF_2$ (melting point: 1,263° C.), $SrF_2$ (melting point: 1,473° C.) and $BaF_2$ (melting point: 1,355° C.).

Examples of the chloride of A include NaCl (melting point: 801° C.), KCl (melting point: 770° C.), RbCl (melting point: 718° C.), CsCl (melting point: 645° C.), $CaCl_2$) (melting point: 782° C.), $MgCl_2$ (melting point: 714° C.), $SrCl_2$ (melting point: 857° C.) and $BaCl_2$ (melting point: 963° C.).

Examples of the carbonate of A include $Na_2CO_3$ (melting point: 854° C.), $K_2CO_3$ (melting point: 899° C.), $Rb_2CO_3$ (melting point: 837° C.), $Cs_2CO_3$ (melting point: 793° C.), $CaCO_3$ (melting point: 825° C.), $MgCO_3$ (melting point: 990° C.), $SrCO_3$ (melting point: 1,497° C.) and $BaCO_3$ (melting point: 1,380° C.).

Examples of the sulfate of A include $Na_2SO_4$ (melting point: 884° C.), $K_2SO_4$ (melting point: 1,069° C.), $Rb_2SO_4$ (melting point: 1,066° C.), $Cs_2SO_4$ (melting point: 1,005° C.), $CaSO_4$ (melting point: 1,460° C.), $MgSO_4$ (melting point: 1,137° C.), $SrSO_4$ (melting point: 1,605° C.) and $BaSO_4$ (melting point: 1,580° C.).

Examples of the nitrates of A include $NaNO_3$ (melting point: 310° C.), $KNO_3$ (melting point: 337° C.), $RbNO_3$ (melting point: 316° C.), $CsNO_3$ (melting point: 417° C.), $Ca(NO_3)_2$(melting point: 561° C.), $Mg(NO_3)_2$, $Sr(NO_3)_2$ (melting point: 645° C.), and $Ba(NO_3)_2$ (melting point: 596° C.).

Examples of the phosphate of A include $Na_3PO_4$, $K_3PO_4$ (melting point: 1,340° C.), $Rb_3PO_4$, $s_3PO_4$, $Ca_3(PO_4)_2$, $Mg_3(PO_4)_2$ (melting point: 1,184° C.), $Sr_3(PO_4)_2$ (melting point: 1,727° C.) and $Ba_3(PO_4)_2$ (meting point: 1,767° C.).

Examples of the hydroxide of A include NaOH (melting point: 318° C.), KOH (melting point: 360° C.), RbOH (melting point: 301° C.), CsOH (melting point: 272° C.), $Ca(OH)_2$ (melting point: 408° C.), $Mg(OH)_2$ (melting point: 350° C.), $Sr(OH)_2$ (melting point: 375° C.) and $Ba(OH)_2$ (melting point: 853° C.).

Examples of the molybdate of A include $Na_2MoO_4$ (melting point: 698° C.), $K_2MoO_4$ (melting point: 919° C.), $Rb_2MoO_4$ (melting point: 958° C.), $Cs_2MoO_4$ (melting point: 956° C.), $CaMoO_4$ (melting point: 1,520° C.), $MgMoO_4$ (melting point: 1,060° C.), $SrMoO_4$ (melting point: 1,040° C.) and $BaMoO_4$ (melting point: 1,460° C.).

Examples of the tungstate of A include $Na_2WO_4$ (melting point: 687° C.), $K_2WO_4$. $Rb_2WO_4$. $Cs_2WO_4$, $CaWO_4$, $MgWO_4$, $SrWO_4$ and $BaWO_4$.

In the present embodiment, it is also possible to use two or more of these inert melting agents. When two or more inert melting agents are used, the melting point may be lowered. Further, among these inert melting agents, the inert melting agent for obtaining LiMO having higher crystallinity is preferably any one or combination of a hydroxide, carbonate, sulfate and chloride of A. Moreover, A is preferably either one or both of sodium (Na) and potassium (K). That is, among the above, the inert melting agent is particularly preferably at least one selected from the group consisting of NaOH, KOH, NaCl, KCl, $Na_2CO_3$, $K_2CO_3$, $Na_2SO_4$, and $K_2SO_4$.

In the present embodiment, the inert melting agent is preferably potassium sulfate or sodium sulfate.

[Step (B)]

After the calcination, the obtained calcined product is crushed to obtain a LiMO. The crushing step makes it possible to control the properties of the resulting product so as to satisfy the requirements (2) to (5).

The crushing step is preferably carried out by a roll mill, a disc mill, a pin mill, a ball mill, a jet mill, or a counter jet mill equipped with a classification rotor.

The step (B) preferably includes a crushing step 1 in which the calcined product obtained in the calcination step is crushed until the $D_{50}$ is reduced to 100 μm or less to obtain a crushed powder 1, and a subsequent crushing step 2 in which the crushed powder 1 is crushed until the $D_{50}$ falls within a range of 2 μm to 10 μm to obtain a LiMO. The crushing step 2 is preferably a step in which the crushed powder 1 is crushed until the Do falls within a range of 2 μm to 10 μm to obtain a LiMO.

Each of the crushing step 1 and the crushing step 2 may include a plurality of crushing treatments with different devices.

Pure water or an alkaline cleaning liquid can be used for cleaning away the inert melting agent remaining in the LiMO after the calcination.

Examples of the alkaline washing liquid include an aqueous solution of one or more anhydrides selected from the group consisting of LiOH (lithium hydroxide), NaOH (sodium hydroxide), KOH (potassium hydroxide), $Li_2CO_3$ (lithium carbonate). $Na_2CO_3$ (sodium carbonate), $K_2CO_3$ (potassium carbonate) and $(NH_4)_2CO_3$ (ammonium carbonate), and hydrates thereof. Further, ammonia can also be used as an alkali.

The temperature of the washing liquid used for washing is preferably 15° C. or lower, more preferably 10° C. or lower, and still more preferably 8° C. or lower. By controlling the temperature of the washing liquid within the above range so as not to freeze, it is possible to suppress excessive elution of lithium ions from the crystal structure of the LiMO into the washing liquid during washing.

In the washing step, examples of a method for bringing the washing liquid into contact with the LiMO include the following methods.

1) A method in which LiMO is put into an aqueous solution of each washing liquid, followed by stirring.

2) A method in which an aqueous solution of each washing liquid is sprinkled over LiMO as a shower of water.

3) A method in which LiMO is put into an aqueous solution of each washing liquid, followed by stirring, then the LiMO is separated from the aqueous solution of each washing liquid, and then the aqueous solution of each washing liquid is sprinkled over the LiMO as a shower of water after separation.

Method for Producing LiMO Having Coating Material

For producing a LiMO having a coating material, first, the coating raw material and a LiMO are mixed. Next, by heat-treating as necessary, a coating material composed of a coating raw material can be formed on the surface of the single particles, primary particles or secondary particles of the LiMO.

As the coating material, any of oxides, hydroxides, carbonates, nitrates, sulfates, halides, oxalates and alkoxides can be used, among which oxides are preferable. It is preferable that the coating raw material does not contain Ni.

The mixing of the coating raw material and the LiMO may be carried out in the same manner as in the mixing for preparation of the LiMO. As a specific mixing method, it is preferable to employ a mixing method using a mixing apparatus which is not provided with a mixture media such as balls and which does not cause a strong pulverization, such as a mixing method using a powder mixer having a stirring blade accommodated therein. Further, by retaining the obtained mixture in an atmosphere containing water, a coating material can be firmly adhered to the surface of the LiMO.

With respect to the optional heat treatment to be carried out after mixing the coating material and the LiMO, appropriate conditions therefor (temperature, retention time) may vary depending on the type of the coating material. The temperature for the heat treatment is preferably set within the range of 200 to 850° C., and not higher than the calcination temperature in the production of the LiMO. If the temperature for the heat treatment is higher than the maximum holding temperature for the LiMO, the coating raw material forms a solid solution with the LiMO, which may hinder the formation of the coating material. As the atmosphere for the heat treatment, the same atmosphere as mentioned above for the calcination can be employed.

Alternatively, the LiMO having a coating layer or coating particles can be produced by forming a coating material on the surface of the LiMO by means of sputtering. CVD, vapor deposition, or the like.

In some cases, a LiMO having a coating material can be obtained by mixing and calcining the metal composite oxide or hydroxide, the lithium compound, and the coating raw material.

A LiMO having a coating material on the surface of the single particles, primary particles or secondary particles of the LiMO is appropriately classified.

<Lithium Secondary Battery>

Next, a configuration of a suitable lithium secondary battery when the LiMO of the present embodiment is used as a CAM is described.

Further, a suitable positive electrode for a lithium secondary battery (hereinafter, also referred to as a positive electrode) when the LiMO of the present embodiment is used as a CAM is described below.

Furthermore, a lithium secondary battery as a suitable use of a positive electrode is described below.

In an example, a suitable lithium secondary battery when the LIMO of the present embodiment is used as a CAM includes a positive electrode and a negative electrode, a separator sandwiched between the positive electrode and the negative electrode, and an electrolytic solution disposed between the positive electrode and the negative electrode.

In an example, the lithium secondary battery includes a positive electrode and a negative electrode, a separator sandwiched between the positive electrode and the negative electrode, and an electrolytic solution disposed between the positive electrode and the negative electrode.

Figure 1B:
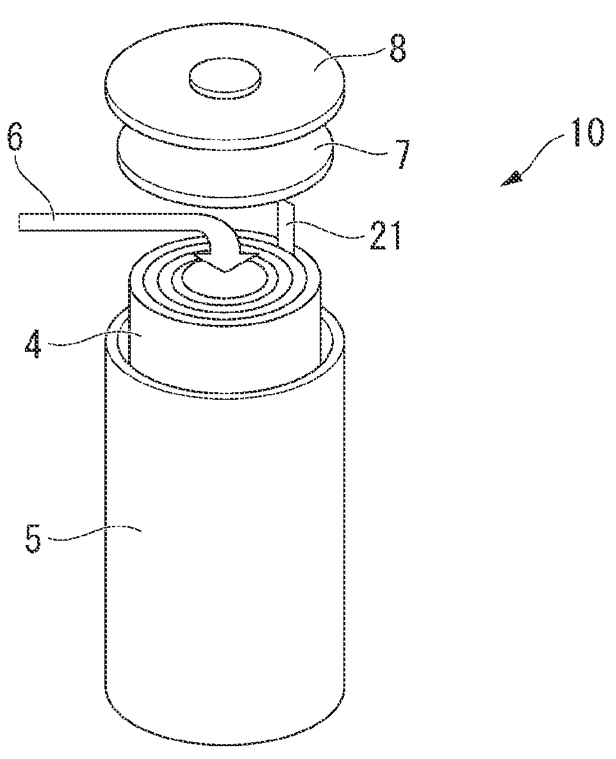
FIG. 1B is a schematic configuration diagram showing an example of a lithium secondary battery.

Each of FIG. 1A and FIG. 1B is a schematic view showing an example of a lithium secondary battery. A cylindrical lithium secondary battery 10 of the present embodiment is manufactured as described below.

First, as illustrated in FIG. 1A, a pair of separators 1 having a strip shape, a strip-shaped positive electrode 2 having a positive electrode lead 21 at one end, and a strip-shaped negative electrode 3 having a negative electrode lead 31 at one end are laminated in an order of the separator 1, the positive electrode 2, the separator 1, and the negative electrode 3, and are wound to obtain an electrode group 4.

Next, as illustrated in FIG. 1B, the electrode group 4 and an insulator (not shown) are put in a battery can 5, then, the bottom of the can is sealed, an electrolytic solution 6 is impregnated into the electrode group 4, and an electrolyte is disposed between the positive electrode 2 and the negative electrode 3. Then, the top section of the battery can 5 is sealed using a top insulator 7 and a sealing body 8, whereby the lithium secondary battery 10 can be obtained.

Examples of the shape of the electrode group 4 include a columnar shape so that the cross-sectional shape when the electrode group 4 is cut in the direction perpendicular to the winding axis is a circle, an ellipse, a rectangle, or a rectangle with rounded corners.

As the shape of the lithium secondary battery including the aforementioned electrode group 4, it is possible to employ the shapes prescribed by iEC60086, which is the standard of batteries prescribed by the International Electrotechnical Commission (IEC), or JIS C 8500. Examples thereof include a cylindrical shape, an angular shape and the like.

The lithium secondary battery is not limited to the wound construction as described above, and may have a laminated construction obtained by laminating a positive electrode, a separator, a negative electrode, a separator, and so forth. Examples of the laminated lithium secondary battery include the so-called coin-type battery, button-type battery, and paper-type (or sheet-type) battery.

Hereinbelow, the respective components are described.

(Positive Electrode)

The positive electrode can be produced by first preparing a positive electrode mix containing a CAM, a conductive material and a binder, and then causing the positive electrode mix to be supported on a positive electrode current collector.

(Conductive Material)

As the conductive material included in the positive electrode active material, a carbonaceous material can be used. Examples of the carbonaceous material include a graphite powder, a carbon black (such as acetylene black) and a fibrous carbonaceous material. Since carbon black is a microparticle and has a large surface area, the addition of only a small amount of the carbon black to the positive electrode mix increases the conductivity within the positive electrode, and improves the charge and discharge efficiency and the output performance as well; however, too large an amount of carbon black deteriorates the binding strength of the binder exerted not only between the positive electrode mix and the positive electrode current collector but also within the positive electrode mix, resulting in an adverse factor that increases an internal resistance.

The ratio of the conductive material in the positive electrode mix is preferably 5 parts by mass or more and 20 parts by mass or less with respect to 100 parts by mass of CAM. In the case of using a fibrous carbonaceous material such as a graphitized carbon fiber or a carbon nanotube as the conductive material, it is also possible to decrease this ratio.

(Binder)

As the binder included in the positive electrode active material of the present embodiment, a thermoplastic resin can be used. Examples of the thermoplastic resin include polyimide resins; fluororesins such as polyvinylidene fluoride (hereinafter, also referred to as PVdF) and polytetrafluoroethylene; polyolefin resins such as polyethylene and polypropylene, and resins described in WO2019/098384A1 or US2020/0274158A1.

Two or more of these thermoplastic resins may be used in the form of a mixture thereof. When a fluororesin and a polyolefin resin are used as binders, it is possible to obtain a positive electrode mix capable of strong adhesive force relative to the positive electrode current collector as well as strong biding force within the positive electrode mix in itself by adjusting the ratio of the fluororesin to fall within the range of from 1% by mass to 10% by mass, and the ratio of the polyolefin resin to fall within the range of from 0.1% by mass to 2% by mass, each based on the total mass of the positive electrode mix.

(Positive Electrode Current Collector)

As the positive electrode current collector included in the positive electrode, it is possible to use a strip-shaped member composed of a metal material such as Al, Ni, or stainless steel as a component material. It is especially preferred to use a current collector which is made of Al and is shaped into a thin film because of its low cost.

Examples of the method for causing the positive electrode mix to be supported on the positive electrode current collector include a method in which the positive electrode mix is press-formed on the positive electrode current collector. Alternatively, the positive electrode mix may be caused to be supported on the positive electrode current collector by a method including producing a paste from the positive electrode mix using an organic solvent, applying the obtained paste of the positive electrode mix to at least one surface of the positive electrode current collector, drying the paste, and press-bonding the resultant to the current collector.

Examples of the organic solvent that can be used in the case of producing the paste from the positive electrode mix include an amine-based solvent such as N,N-dimethylaminopropylamine and diethylenetriamine; an ether-based solvent such as tetrahydrofuran; a ketone-based solvent such as methyl ethyl ketone; an ester-based solvent such as methyl acetate; and an amide-based solvent such as dimethylacetamide and N-methyl-2-pyrrolidone (hereinafter, also referred to as NMP).

Examples of the method for applying the paste of the positive electrode mix to the positive electrode current collector include a slit die coating method, a screen coating method, a curtain coating method, a knife coating method, a gravure coating method, and an electrostatic spray method.

The positive electrode can be produced by the method as described above.

(Negative Electrode)

The negative electrode included in the lithium secondary cell is not particularly limited as long as it is capable of doping and de-doping lithium ions at a potential lower than the positive electrode, and examples thereof include an electrode comprising a negative electrode current collector having supported thereon a negative electrode mix including a negative electrode active material, and an electrode constituted solely of a negative electrode active material.

(Negative Electrode Active Material)

Examples of the negative electrode active material included in the negative electrode include materials which are carbonaceous materials, chalcogen compounds (oxides, sulfides, etc.), nitrides, metals or alloys, and allow lithium ions to be doped or de-doped at a potential lower than the positive electrode.

Examples of the carbonaceous materials that can be used as the negative electrode active material include graphite such as natural graphite and artificial graphite, cokes, carbon black, pyrolytic carbons, carbon fibers, and organic macromolecular compound-sintered bodies.

Examples of the oxide that can be used as the negative electrode active material include oxides of silicon represented by a formula: $SiO_x$ (wherein x is a positive real number) such as $SiO_2$ and SiO; oxides of tin represented by a formula: $SnO_x$ (wherein x is a positive real number) such as $SnO_2$ and SnO; and composite metal oxides containing lithium and titanium such as $Li_4Ti_5O_{12}$.

Examples of metals that can be used as the negative electrode active material include lithium metals, silicon metals, tin metals, etc.

As a material that can be used as the negative electrode active material, materials described in WO2019/098384A1 or US2020/0274158A1 may be used.

The metals or alloys are processed into, for example, a foil, and are in many cases used alone as an electrode.

Among the aforementioned negative electrode materials, carbonaceous materials composed mainly of graphite such as natural graphite or artificial graphite are preferably used for the following reasons: the potential of the negative electrode hardly changes during charging from a uncharged state to a fully charged state (the potential flatness is favorable), the average discharge potential is low, the capacity retention after repeated charge/discharge cycles is high (the cycling performance is favorable), etc. Examples of the shape of the carbonaceous material include a flake shape as in the case of natural graphite, a spherical shape as in the case of mesocarbon microbeads, a fibrous shape as in the case of a graphitized carbon fiber, an agglomerate of fine powder, etc., and the carbonaceous material may have any of these shapes.

The negative electrode mix may include a binder as necessary. As the binder, a thermoplastic resin can be used, and specific examples thereof include PVdF, thermoplastic polyimides, carboxymethyl cellulose (hereinafter, also referred to as CMC), styrene-butadiene rubbers (hereinafter, also referred to as SBR), polyethylene and polypropylene.

(Negative Electrode Current Collector)

Examples of the negative electrode current collector included in the negative electrode include a strip-shaped member composed of a metal material such as Cu, Ni or stainless steel as a component material. Among these, it is preferred to use a current collector which is made of Cu and is shaped into a thin film, since Cu is unlikely to form an alloy with lithium and can be easily processed.

Examples of the method for causing the negative electrode mix to be supported on the above-described negative electrode current collector include, as in the case of the positive electrode, a press forming method, and a method in which a paste of the negative electrode mix obtained by using a solvent etc., is applied to and dried on the negative electrode current collector, and the resulting is press bonded to the current collector.

(Separator)

As the separator used in the lithium secondary battery, for example, it is possible to use one that is formed of a material such as a polyolefin resin (e.g., polyethylene or polypropylene), a fluororesin or a nitrogen-containing aromatic polymer, and has a form of a porous film, a nonwoven fabric, a woven fabric or the like. The separator may be composed of two or more of the materials mentioned above, or may be formed by laminating these materials. Moreover, separators described in JP-A-2000-030686 and In the present embodiment, for satisfactory permeation of the electrolyte through the separator during the use (charge and discharge) of the cell, the separator preferably has an air resistance of 50 sec/100 cc or more and 300 sec/100 cc or less, more preferably 50 sec/100 cc or more and 200 sec/100 cc or less, as measured by Gurley method prescribed in JIS P 8117.

Further, the porosity of the separator is preferably 30% by volume or more and 80% by volume or less, and more preferably 40% by volume or more and 70% by volume or less with respect to the total volume of the separator. The separator may be a laminate of separators having different porosities.

(Electrolytic Solution)

The electrolytic solution used in the lithium secondary battery of the present embodiment contains an electrolyte and an organic solvent.

Examples of the electrolyte contained in the electrolytic solution include lithium salts such as $LiClO_4$ and $LiPF_6$, and a mixture of two or more of these salts may be used. Further, electrolytes described in WO2019/098384A1 or US2020/0274158A1 may be used. Among these electrolytes, it is preferred to use at least one fluorine-containing salt selected from the group consisting of $LiPF_6$, $LiAsF_6$, $LiSbF_6$, $LiBF_4$, $LiCF_3SO_3$, $LiN(SO_2CF_3)_2$ and $LiC(SO_2CF_3)_3$.

Further, as the organic solvent contained in the above electrolytic solution, for example, propylene carbonate, ethylene carbonate, dimethyl carbonate, diethyl carbonate, ethyl methyl carbonate, and organic solvents described in WO2019/098384A1 or US2020/0274158A1 can be used.

As the organic solvent, it is preferable to use a mixture of two or more of these organic solvents. Among the aforementioned organic solvents, a solvent mixture including a carbonate is preferable, and a solvent mixture of a cyclic carbonate and a non-cyclic carbonate and a solvent mixture of a cyclic carbonate and ether are more preferable. As the solvent mixture of a cyclic carbonate and a non-cyclic carbonate, a solvent mixture including ethylene carbonate, dimethyl carbonate, and ethyl methyl carbonate is preferable. An electrolytic solution using the aforementioned solvent mixture has many advantages such as a broader operational temperature range, a low tendency of deterioration even after charge/discharge at a high current rate, a low tendency of deterioration even when used for a long period of time, and a low decomposability even when a graphite material such as natural graphite or artificial graphite is used as the active material for the negative electrode.

For improving the stability of the obtained lithium secondary battery, it is preferable to use an electrolytic solution including a lithium salt containing fluorine such as $LiPF_6$ and an organic solvent having a fluorine substituent. A solvent mixture including ether having a fluorine substituent such as pentafluoropropyl methyl ether or 2,2,3,3-tetrafluoropropyl difluoromethyl ether and dimethyl carbonate is more preferable since a high capacity retention is achievable even when the battery is charged and discharged at a high current rate.

<All-Solid-State Lithium Secondary Battery>

Next, a positive electrode using LiMO according to one aspect of the present invention as a positive electrode active material of an all-solid-state lithium secondary battery, and an all-solid-state lithium secondary battery having this positive electrode is described below while explaining the configuration of the all-solid-state lithium secondary battery.

Figure 7:
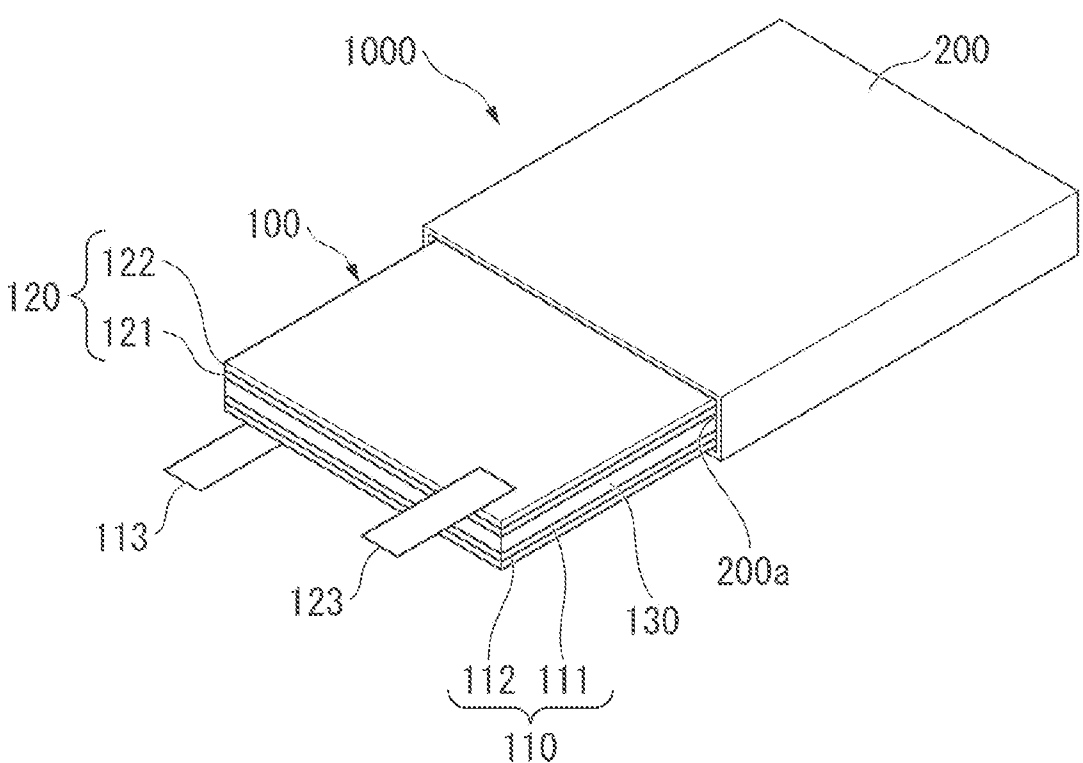
FIG. 7 is a schematic diagram showing an example of an all-solid-state lithium secondary battery.

FIG. 7 is a schematic view illustrating an example of the all-solid-state lithium secondary battery of the present embodiment. The all-solid-state secondary battery 1000 shown in FIG. 7 includes a laminate 100 having a positive electrode 110, a negative electrode 120 and a solid electrolyte layer 130, and an exterior body 200 accommodating the laminate 100. Further, the all-solid-state lithium secondary battery 1000 may have a bipolar structure in which a positive electrode active material and a negative electrode active material are arranged on both sides of a current collector. Specific examples of the bipolar structure include structures described in JP-A-2004-95400. Materials constituting the respective components are described in a later section.

The laminate 100 may have an external terminal 113 connected to a positive electrode current collector 112 and an external terminal 123 connected to a negative electrode current collector 122. In addition, the all-solid-state lithium secondary battery 1000 may have a separator between the positive electrode 110 and the negative electrode 120.

The all-solid-state lithium secondary battery 1000 further has an insulator (not shown) that insulates the laminate 100 and the exterior body 200 from each other, and a sealant (not shown) that seals an opening 200*a* of the exterior body 200.

As the exterior body 200, a container obtained by molding a metal material having high corrosion resistance such as aluminum, stainless steel or nickel-plated steel can be used. In addition, as the exterior body 200, a container obtained by processing a laminate film with at least one surface having been subjected to a corrosion resistant treatment into a bag shape can also be used.

Examples of the shape of the all-solid-state lithium secondary battery 1000 include shapes such as a coin type, a button type, a paper type (or a sheet type), a cylindrical type, a square type, and a laminate type (pouch type).

Although a form of the all-solid-state lithium secondary battery 1000 having one laminate 100 is illustrated as an example, the present embodiment is not limited thereto. The all-solid-state lithium secondary battery 1000 may have a configuration in which the laminate 100 serves as a unit cell and a plurality of unit cells (laminates 100) are sealed inside the exterior body 200.

Hereinbelow, the respective components are described.

(Positive Electrode)

The positive electrode 110 of the present embodiment has a positive electrode active material layer 11 and a positive electrode current collector 112.

The positive electrode active material layer 111 contains the positive electrode active material according to one aspect of the present invention described above, and a solid electrolyte. Further, the positive electrode active material layer 111 may contain a conductive material and a binder.

(Solid Electrolyte)

As the solid electrolyte contained in the positive electrode active material layer 111 of the present embodiment, a solid electrolyte that is lithium ion-conductive and used in a known all-solid lithium secondary battery can be adopted. Examples of such a solid electrolyte include an inorganic electrolyte and an organic electrolyte. Examples of the inorganic electrolyte include an oxide-based solid electrolyte, a sulfide-based solid electrolyte, and a hydride-based solid electrolyte. Examples of the organic electrolyte include polymer-based solid electrolytes. Examples of each electrolyte include compounds described in WO2020/208872A1, US2016/0233510A1, US2012/0251871A1 and US2018/0159169A1, and specific examples thereof include the following compounds.

(Oxide-Based Solid Electrolyte)

Examples of the oxide-based solid electrolyte include perovskite-type oxides, NASICON-type oxides, LISICON-type oxides and garnet-type oxides. Specific examples of each oxide include compounds described in WO2020/208872A1, US2016/0233510A1 and US2020/0259213A1.

Examples of the garnet-type oxide include Li—La—Zr-based oxides such as $Li_7La_3Zr_2O_{12}$ (also referred to as LLZ).

The oxide-based solid electrolyte may be a crystalline material or an amorphous material.

(Sulfide-Based Solid Electrolyte)

Examples of the sulfide-based solid electrolyte include $Li_2S—P_2S_5$-based compounds, $Li_2S—SiS_2$-based compounds, $Li_2S—GeS_2$-based compounds, $Li_2S—B_2S_3$-based compounds, LiI—$Si_2S—P_2S_5$-based compounds, LiI—$Li_2S—P_2O_5$-based compounds, LiI—$Li_3PO_4—P_2S_5$-based compounds and $Li_{10}GeP_2S_{12}$.

In the context of the present specification, the expressions with "-based compound" indicating sulfide-based solid electrolytes are used as generic terms that denote solid electrolytes composed mainly of raw materials, such as "$Li_2S$" and "$P_2S_5$", which are described before "-based compound". For example, the $Li_2S—P_2S_5$-based compounds encompass solid electrolytes mainly containing $Li_2S$ and $P_2S_5$ and further containing other raw materials. The ratio of $Li_2S$ contained in the $Li_2S—P_2S_5$-based compound is, for example, 50 to 90% by mass with respect to the entire $Li_2S—P_2S_5$-based compound. The ratio of $P_2S_5$ contained in the $Li_2S—P_2S_5$-based compound is, for example, 10 to 50% by mass with respect to the entire $Li_2S—P_2S_5$-based compound. Further, the ratio of other raw materials contained in the $Li_2S—P_2S_5$-based compound is, for example, 0 to 30% by mass with respect to the entire $Li_2S—P_2S_5$-based compound. Moreover, the $Li_2S—P_2S_5$-based compounds also encompass solid electrolytes containing $Li_2S$ and $P_2S_5$ in different mixing ratios.

Examples of the $Li_2S—P_2S_5$-based compound include $Li_2S—P_2S_5$, $Li_2S—P_2S_5$—LiI, $Li_2S—P_2S_5$—LiCl, $Li_2S—P_2S_5$—LiBr, and $Li_2S—P_2S_5$—LiI—LiBr.

Examples of the $Li_2S$—$SiS_2$-based compound include $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$SiS_2$—$P_2S_5$—LiCl, and the like.

Examples of the $Li_2S$—$GeS_2$-based compound include $Li_2S$—$GeS_2$ and $Li_2S$—$GeS_2$—$P_2S_5$.

The sulfide-based solid electrolyte may be a crystalline material or an amorphous material.

Two or more types of solid electrolytes can be used in combination as long as the effects of the invention are not impaired.

(Conductive Material and Binder)

As a conductive material included in the positive electrode active material layer 111 of the present embodiment, a material described in the above section entitled (Conductive material) can be used. Likewise, as for the ratio of the conductive material in the positive electrode mix, the ratio described in the above section entitled (Conductive material) can be applied. Moreover, as a binder included in the positive electrode, a material described in the above section entitled (Binder) can be used.

(Positive Electrode Current Collector)

As the positive electrode current collector 112 included in the positive electrode 110 of the present embodiment, a material described in the above section entitled (Positive electrode current collector) can be used.

Examples of the method for causing the positive electrode active material layer 111 to be supported on the positive electrode current collector 112 include a method in which the positive electrode active material layer 111 is pressure molded on the positive electrode current collector 112. A cold press or a hot press can be used for pressure molding.

Further, the positive electrode active material layer 111 may be caused to be supported on the positive electrode current collector 112 by producing a positive electrode mix from a paste of a mixture of a positive electrode active material, a solid electrolyte, a conductive material and a binder using an organic solvent, and applying the obtained positive electrode mix on at least one surface of the positive electrode current collector 112, followed by drying and pressing the resultant for fixation.

Further, the positive electrode active material layer 111 may be caused to be supported on the positive electrode current collector 112 by producing a positive electrode mix from a paste of a mixture of a positive electrode active material, a solid electrolyte, and a conductive material using an organic solvent, and applying the obtained positive electrode mix on at least one surface of the positive electrode current collector 112, followed by drying and sintering the resultant.

As the organic solvent that can be used for the positive electrode mix, the same organic solvent that can be used when the positive electrode mix described above in the above section entitled (Positive electrode current collector) is formed into a paste can be used.

Examples of the method for applying the positive electrode mix on the positive electrode current collector 112 include the method described in the above section entitled (Positive electrode current collector).

The positive electrode 110 can be produced by the method as described above.

(Negative Electrode)

The negative electrode 120 has a negative electrode active material layer 121 and a negative electrode current collector 122. The negative electrode active material layer 121 includes a negative electrode active material. Further, the negative electrode active material layer 121 may contain a solid electrolyte and a conductive material. As the negative electrode active material, the negative electrode current collector, the solid electrolyte, the conductive material and the binder, those described above can be used.

Examples of the method for causing the negative electrode active material layer 121 to be supported on the negative electrode current collector 122 include, as in the case of the positive electrode 110, a method by pressure molding, a method in which a negative electrode mix in the form of a paste containing a negative electrode active material is applied to and dried on the negative electrode current collector 122, followed by pressure bonding, and a method in which a negative electrode mix in the form of a paste containing a negative electrode active material is applied to and dried on the negative electrode current collector 122, followed by sintering.

(Solid Electrolyte Layer)

A solid electrolyte layer 130 includes the above-mentioned solid electrolyte.

The solid electrolyte layer 130 can be formed by allowing a solid electrolyte of an inorganic substance to be deposited on the surface of the positive electrode active material layer 111 included in the above-mentioned positive electrode 110 by a sputtering method.

Further, the solid electrolyte layer 130 can be formed by applying and drying a paste-like mix containing a solid electrolyte on the surface of the positive electrode active material layer 111 included in the above-mentioned positive electrode 110. After drying, the solid electrolyte layer 130 may be formed by press molding and further pressurizing by a cold isostatic pressing method (CIP).

The laminate 100 can be produced by laminating the negative electrode 120 on the solid electrolyte layer 130 provided on the positive electrode 110 as described above by using a known method so that the negative electrode active material layer 121 comes into contact with the surface of the solid electrolyte layer 130.

Since the CAM having the above configuration uses the LiMO produced by the present embodiment as described above, the resistance of the lithium secondary battery using the CAM can be reduced.

Further, since the positive electrode having the above configuration has a CAM having the above-mentioned configuration, the resistance of the lithium secondary battery can be reduced.

Furthermore, since the lithium secondary battery having the above configuration includes the above-mentioned positive electrode, the secondary battery shows a low resistance.

EXAMPLES

Hereinbelow, the present invention will be described in more detail with reference to the Examples.

<Composition Analysis>

The composition analysis of LiMO produced by the method described below was carried out using an ICP emission spectrophotometer (SPS3000 manufactured by SII Nanotechnology Inc.) after the obtained LiMO powder was dissolved in hydrochloric acid.

<Measurement of $D_{50}$ (Volume-Based 50% Cumulative Particle Size) of LiMO>

First, 0.1 g of the LiMO powder to be measured was put into 50 ml of 0.2% by mass aqueous sodium hexametaphosphate solution to obtain a dispersion liquid in which the LiMO powder was dispersed.

The obtained dispersion was subjected to a particle size distribution measurement using a laser scattering particle size distribution measuring apparatus (Mastersizer 2000, manufactured by Malvern Instruments Ltd.), whereby the volume-based particle size distribution curve was obtained.

In the cumulative particle size distribution curve obtained, the volume-based particle size at 50% cumulation was defined as $D_{50}$, i.e., volume-based 50% cumulative particle size, of the LiMO.

<Observation of Surface of Single Particles and Measurement of Particle Size of Single Particles>

First, the LiMO was placed on a conductive sheet affixed on a sample stage.

Then, an observation was implemented while irradiating the LiMO with an electron beam with an accelerated voltage of 20 kV using a scanning electron microscope (JSM-5510, manufactured by JEOL Ltd.).

Then, 50 to 98 single particles were extracted from the obtained electron microscope image (SEM photograph) by the following method.

(Single Particle Extraction Method)

When measuring the particle size of the single particles, the single particles included in one field of view were the measurement target. When the number of single particles contained in one field of view was less than 50, the number of field of view was increased until 50 or more single particles were secured as the measurement target. Further, when the single particles overlapped or were in contact with each other in the SEM observation, the single particle in the foreground in the SEM field of view was selected as the measurement target.

With respect to the image of each of the extracted single particles, parallel lines were drawn from a certain direction so as to sandwich the image of the single particle, and the distance between the parallel lines (Feret diameter) was measured as the particle size of the single particle.

The arithmetic mean value of the obtained particle sizes of the single particles was taken as the average particle size of the single particles contained in the LiMO.

The extracted single particles were observed with respect to a field of view with a magnification of 20000 times to confirm whether or not fine particles were adhered to the surface of the single particles, and the number of the adhered fine particles was measured by the method described in a later section.

<Measurements of Particle Size of Adhered Fine Particles and Average Number of Adhered Fine Particles>

From the single particles extracted above, single particles having a particle size of 0.2 to 1.5 times the $D_{50}$ so of the LiMO were extracted in the field of view described above.

The number of adhered fine particles present on the surface of the extracted single particles was counted and used as the number of adhered fine particles adhered to the surface of one single particle. The adhered fine particles counted were those which were smaller than the single particles on which the fine particles were adhered, and had a particle size which was 0.01 to 0.1 times the $D_{50}$ of the LiMO in the observed field of view described above.

In this context, the particle size of the adhered fine particles was defined as the distance (Feret diameter) between the parallel lines drawn from a certain direction so as to sandwich an image of the single particle. The surface of a single particle refers to the surface region of the single particle that is visually recognizable in the observation field of view.

The same measurement was performed for 30 single particles, and the average number of adhered fine particles present on the surfaces of the single particles was obtained as an average number of the adhered fine particles adhered per particle of the single particles.

<Measurement of BET Specific Surface Area>

The BET specific surface area (unit: $m^2/g$) was measured by Macsorb (registered trademark) manufactured by Mountech Co., Ltd. after drying 1 g of the LiMO in a nitrogen atmosphere at 105° C. for 30 minutes.

<Production of Positive Electrode for Lithium Secondary Battery>

The LiMO obtained by the production method described later, a conductive material (acetylene black) and a binder (PVdF) were added and kneaded so as to achieve a composition of LiMO:conductive material:binder=92:5:3 (mass ratio) to prepare a positive electrode mix in the form of a paste. In preparation of the positive electrode mix, N-methyl-2-pyrrolidone was used as an organic solvent.

The obtained positive electrode mix was applied to an Al foil having a thickness of 40 μm to serve as a current collector, dried at 60° C. for 1 hour, and vacuum dried at 150° C. for 8 hours to obtain a positive electrode for a lithium secondary battery. The electrode area of the positive electrode for a lithium secondary battery was 34. 96 $cm^2$ <Production of Lithium Secondary Battery (Coin Type Half Cell)>

The following operations were performed in a glove box with an argon atmosphere.

The positive electrode for a lithium secondary battery produced in the section entitled <Production of positive electrode for lithium secondary battery> was placed on a lower lid of a part for a coin-type battery R2032 (manufactured by Hohsen Corporation) with the aluminum foil surface facing down, and a separator (porous polyethylene film) was placed thereon, 300 μl of an electrolytic solution was injected thereinto. As the electrolytic solution, a mixture solution of ethylene carbonate, dimethyl carbonate and ethyl methyl carbonate at a ratio of 30:35:35 (volume ratio) in which LiPF6 was dissolved at a ratio of 1.0 mol/l was used.

Next, using metallic lithium as an negative electrode, the negative electrode was placed on the upper side of a laminate film separator, covered with an upper lid through a gasket, and swaged using a swaging machine to produce a lithium secondary battery (coin-type half cell R2032, hereinafter also referred to as "half cell").

Charge Transfer Resistance

ETS measurement of the battery was performed using the half cell produced by the above method, and the charge transfer resistance of the CAM was calculated from the obtained results.

The EIS measurement was performed at 25° C. with 100% SOC. Using the Cole-Cole plot generated from the obtained measurement data, the charge transfer resistance was obtained from the size of the are of the Cole-Cole plot obtained by using the Instant Fit function of the analysis software ZView2 provided by Solartron.

Example 1

Production of LiMO1

After putting water in a reaction vessel equipped with a stirrer and an overflow pipe, an aqueous sodium hydroxide solution was added, and the liquid temperature was maintained at 50° C.

An aqueous nickel sulfate solution, an aqueous cobalt sulfate solution, and an aqueous manganese sulfate solution were mixed so that the atomic ratio of nickel atoms, cobalt atoms and manganese atoms was 0.60:0.20:0.20 to prepare a raw material mixture solution 1.

Then, the obtained raw material mixture solution 1 and an aqueous ammonium sulfate solution as a complexing agent were continuously added to the reaction vessel with stirring. An aqueous sodium hydroxide solution was dropwise added thereto at an appropriate timing such that the pH of the solution in the reaction vessel became 12.1 (value measured with the temperature of the aqueous solution being 40° C.), thereby obtaining nickel-cobalt-manganese composite hydroxide particles. The obtained nickel-cobalt-manganese composite hydroxide particles were washed and then dehydrated with a centrifugal separator. The resulting was isolated and dried at 105° C. to obtain a nickel-cobalt-manganese composite hydroxide 1.

The nickel-cobalt-manganese composite hydroxide 1 and a lithium hydroxide powder were weighed and mixed so that Li/(Ni+Co+Mn)=1.05. The mixture was calcined at 1,000° C. for 5 hours under an oxygen atmosphere while maintaining the ratio of the oxygen gas supply rate ($Nm^3$/min) to the supply rate of the mixture (kg/min) (oxygen gas supply rate/mixture supply rate) at 5, thereby obtaining a calcined powder 1.

The obtained calcined powder 1 was roughly crushed with a roll mill, and the resulting was crushed with a disc mill (Super Masscolloider MKCA6-2J, manufactured by Masuko Sangyo Co., Ltd.) driven with a gap of 100 μm and at 1200 rpm so as to give the $D_{50}$, of 100 μm or less.

Then, the resulting was introduced into a pin mill (impact Mill AVIS-100, manufactured by Millsystem Co., Ltd.) driven at a rotation speed of 16000 rpm for further crushing, thereby obtaining LiMO1.

Evaluation of LiMO1

<Composition Analysis Results>

The composition analysis was implemented for the LiMO1, and the results were applied to the composition formula: $Li[Li_x(Ni_{(1-y-z-w)}Co_yMn_zM_w)_{1-x}]O_2$ (M is at least one element selected from the group consisting of Fe, Cu. Ti, Mg, Al, W, Mo, Nb, Zn, Sn, Zr, Ga, V, B, Si, S and P) to find that x=0.02, y=0.200, z=0.200, and w=0.000.

<Measurement Results for $D_{50}$ (Volume-Based 50% Cumulative Particle Size) of LiMO>

The volume-based 50% cumulative particle size ($D_{50}$) of LiMO1 was 5. 8 μm.

<Results of Observation of Surface of Single Particles and Measurement of Particle Size of Single Particles>

An electron microscope image (SEM photograph) was acquired for the LiMO1.

Figure 3A:
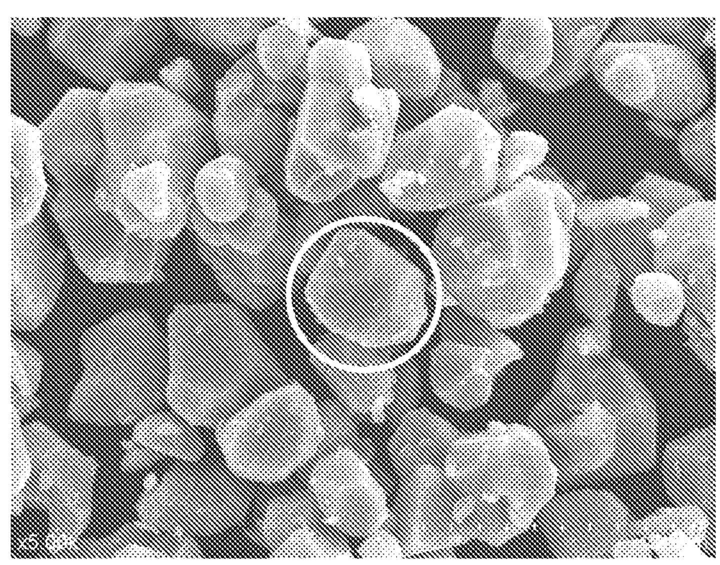
FIG. 3A is a SEM photograph of single particles contained in the lithium metal composite oxide produced in Example 1.
Figure 3B:
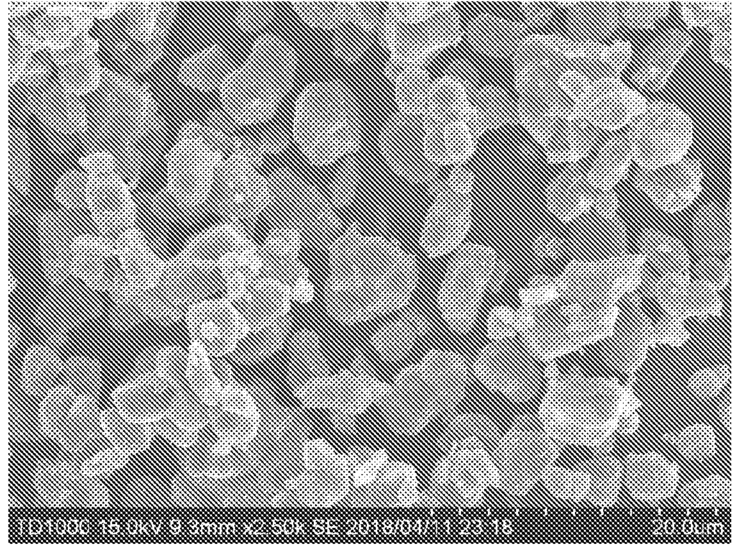
FIG. 3B is a SEM photograph of single particles contained in the lithium metal composite oxide produced in Example 1.

A SEM photograph with a 5000× field of view is shown in FIG. 3A, and a SEM photograph with a 2500× field of view is shown in FIG. 3B.

As shown in FIG. 3B, the LiMO1 contained single particles. The single particles had adhered fine particles on a part of their surfaces. It was confirmed that the maximum particle size of the adhered fine particles was smaller than the particle size of the single particles.

Figure 4:
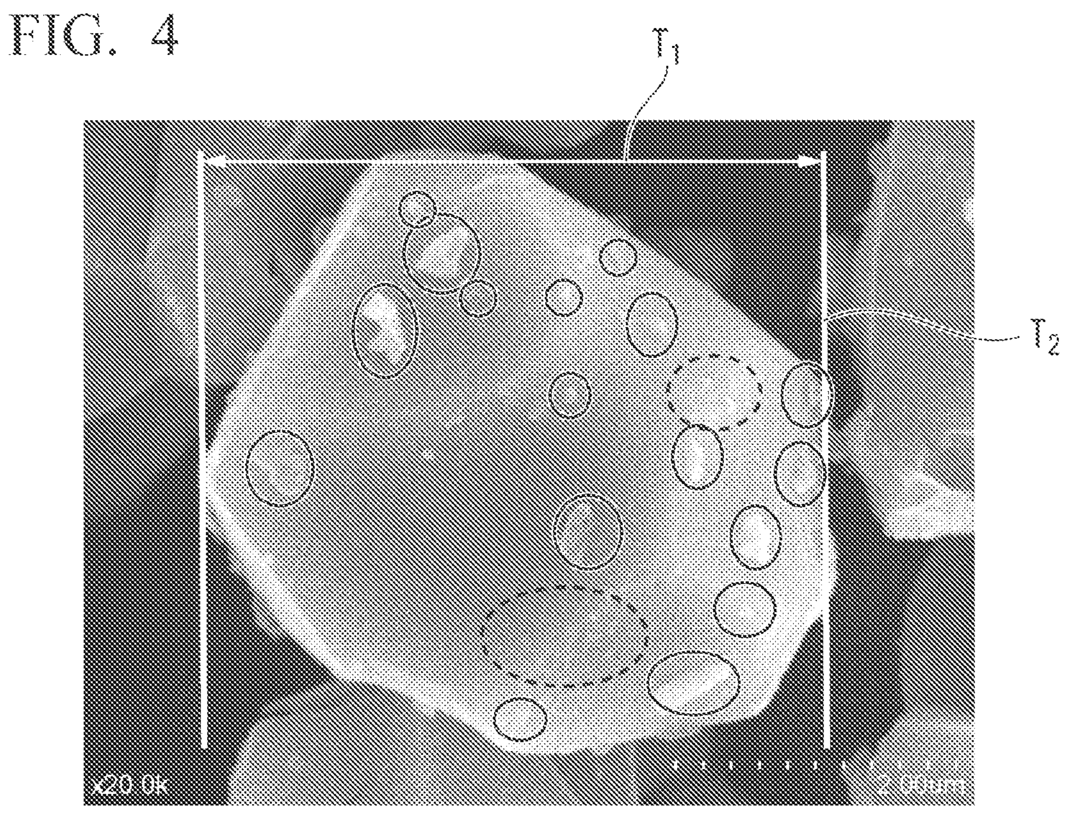
FIG. 4 is a SEM photograph of a single particle contained in the lithium metal composite oxide produced in Example 1.

An enlarged photograph (×20,000) of a single particle surrounded by a solid line in FIG. 3A is shown in FIG. 4.

The particle size of the single particles indicated by the symbols T1 and T2 in FIG. 4 was 4. 6 μm.

In Example 1, the average particle size of the single particles was 3.8 μm.

<Measurement Results for Particle Size of Adhered Fine Particles and Average Number of Adhered Fine Particles>

In FIG. 4, the adhered fine particles satisfying the particle size of the requirement (4) are shown with a solid line, while the adhered fine particles not satisfying the particle size of the requirement (4) are shown with a broken line.

The particle size of the adhered fine particles surrounded by the solid line was 0.06 μm to 0.6 μm.

Further, the average number of adhered fine particles adhered per particle of the single particles was 13.

Evaluation of Charge Transfer Resistance of LiMO

A half cell was prepared using the LiMO1, and the charge transfer resistance was measured and found to be 7.70Ω.

Example 2

Production of LiMO2

After putting water in a reaction vessel equipped with a stirrer and an overflow pipe, an aqueous sodium hydroxide solution was added, and the liquid temperature was maintained at 50° C.

An aqueous nickel sulfate solution, an aqueous cobalt sulfate solution, and an aqueous manganese sulfate solution were mixed so that the atomic ratio of nickel atoms, cobalt atoms and manganese atoms was 0.91:0.05:0.04 to prepare a raw material mixture solution 2.

Then, the obtained raw material mixture solution 2 and an aqueous ammonium sulfate solution as a complexing agent were continuously added to the reaction vessel with stirring. An aqueous sodium hydroxide solution was dropwise added thereto at an appropriate timing such that the pH of the solution in the reaction vessel became 10.6 (value measured with the temperature of the aqueous solution being 40° C.), thereby obtaining nickel-cobalt-manganese composite hydroxide particles.

The obtained particles were washed and dehydrated. The resulting was isolated and dried at 105° C. to obtain a nickel-cobalt-manganese composite hydroxide 2.

The nickel-cobalt-manganese composite hydroxide 2 and a lithium hydroxide powder were weighed and mixed so that Li/(Ni+Co+Mn)=1.20, and $K_2SO_4/(LiOH+K_2SO_4)$=0.10 (mol/mol).

Then, the mixture was calcined at 820° C. for 5 hours under an oxygen atmosphere while maintaining the ratio of the oxygen gas supply rate ($Nm^3$/min) to the supply rate of the mixture (kg/min) (oxygen gas supply rate/mixture supply rate) at 5, thereby obtaining a calcined powder 2.

The obtained calcined powder 2 was roughly crushed with a roll mill to obtain a crushed powder 2.

A slurry prepared by mixing the crushed powder 2 and pure water so that the weight ratio of the crushed powder 2 was 0.3 with respect to the total amount was stirred for 20 minutes, then dehydrated and isolated. The resulting was dried at 150° C. to obtain a dried powder 2.

The obtained dried powder 2 was crushed with a disc mill (Super Masscolloider MKCA6-2J, manufactured by Masuko Sangyo Co., Ltd.) driven with a gap of 100 μm and at 1200 rpm so as to give the $D_{50}$ of 100 μm or less.

Then, the resulting was introduced into a pin mill (Impact Mill AVIS-100, manufactured by Millsystem Co., Ltd.) driven at a rotation speed of 16000 rpm for further crushing, thereby obtaining LiMO2.

Evaluation of LiMO2

<Composition Analysis Results>

The composition analysis was implemented for the LiMO2, and the results were applied to the composition formula: $Li[Li_x(Ni_{(1-y-z-w)}Co_yMn_zM_w)_{1-x}]O_2$ (M is at least one element selected from the group consisting of Fe, Cu, Ti, Mg, Al, W, Mo, Nb, Zn, Sn, Zr, Ga, V, B, Si, S and P) to find that x=0.02, y=0.050, z=0.040, and w=0.000.

<Measurement Results for Duo (Volume-Based 50% Cumulative Particle Size) of LiMO>

The volume-based 50% cumulative particle size ($D_{50}$) of LiMO2 was 3.3 μm.

<Results of Observation of Surface of Single Particles and Measurement of Particle Size of Single Particles>

The observation of the LiMO2 in a field of view with a magnification of 5000 times revealed that the LiMO2 contained single particles.

The single particles had adhered fine particles on a part of their surfaces. It was confirmed that the maximum particle size of the adhered fine particles was smaller than the particle size of the single particles.

In Example 2, the average particle size of the single particles was 2.1 μm.

<Measurement Results for Particle Size of Adhered Fine Particles and Average Number of Adhered Fine Particles>

In Example 2, the particle size of the adhered fine particles was 0.03 μm to 0.3 μm.

Further, the average number of adhered fine particles adhered per particle of the single particles was 4.

Evaluation of Charge Transfer Resistance of LiMO2

A half cell was prepared using the LiMO2, and the charge transfer resistance was measured and found to be 9.90Ω.

Example 3

Production of LiMO3

An aqueous nickel sulfate solution, an aqueous cobalt sulfate solution, an aqueous manganese sulfate solution, and zirconium sulfate were mixed so that the atomic ratio of nickel atoms, cobalt atoms, manganese atoms and zirconium atoms was 0.597:0.198:0.198:0.005 to prepare a raw material mixture solution 3.

Then, the obtained raw material mixture solution 3 and an aqueous ammonium sulfate solution as a complexing agent were continuously added to the reaction vessel with stirring. An aqueous sodium hydroxide solution was dropwise added thereto at an appropriate timing such that the pH of the solution in the reaction vessel became 12.1 (value measured with the temperature of the aqueous solution being 40° C.), thereby obtaining nickel-cobalt-manganese-zirconium composite hydroxide particles. The obtained nickel-cobalt-manganese-zirconium composite hydroxide particles were washed and then dehydrated with a centrifugal separator. The resulting was isolated and dried at 105° C. to obtain a nickel-cobalt-manganese-zirconium composite hydroxide 1.

The nickel-cobalt-manganese-zirconium composite hydroxide 1 and a lithium hydroxide powder were weighed and mixed so that Li/(Ni+Co+Mn)=1.05.

Then, the mixture was calcined at 1000° C. for 5 hours under an oxygen atmosphere while maintaining the ratio of the oxygen gas supply rate ($Nm^3$/min) to the supply rate of the mixture (kg/min) (oxygen gas supply rate/mixture supply rate) at 10, thereby obtaining a calcined powder 3.

The obtained calcined powder 3 was roughly crushed with a roll mill, and the resulting was crushed with a disc mill (Super Masscolloider MKCA6-2J, manufactured by Masuko Sangyo Co., Ltd.) driven with a gap of 100 μm and at 1200 rpm so as to give the $D_{50}$ of 100 μm or less.

Then, the resulting was introduced into a pin mill (impact Mill AVIS-100, manufactured by Millsystem Co., Ltd.) driven at a rotation speed of 16000 rpm for further crushing, thereby obtaining a crushed calcined powder 1.

Then, the crushed calcined powder 1 and boric acid were weighed and mixed at a ratio B/(Ni+Co+Mn)=0.010, and the resulting was heat-treated at 400° C. for 5 hours in an oxygen atmosphere to obtain LiMO powder 3.

Evaluation of LiMO3

<Composition Analysis Results>

The composition analysis was implemented for the LiMO3, and the results were applied to the composition formula: $Li[Li_x(Ni_{(1-y-z-w)}Co_yMn_zM_w)_{1-x}]O_2$ (M is at least one element selected from the group consisting of Fe, Cu, Ti, Mg, Al, W, Mo, Nb, Zn, Sn, Zr, Ga, V, B, Si, S and P) to find that x=0.02, y=0.200, z=0.200, and w=0.005.

<Measurement Results for Duo (Volume-Based 50% Cumulative Particle Size) of LiMO>

The volume-based 50% cumulative particle size ($D_{50}$) of LiMO3 was 5. 5 μm.

<Results of Observation of Surface of Single Particles and Measurement of Particle Size of Single Particles>

The observation of the LiMO3 in a field of view with a magnification of 5000 times revealed that the LiMO3 contained single particles. The single particles had adhered fine particles on a part of their surfaces. It was confirmed that the maximum particle size of the adhered fine particles was smaller than the particle size of the single particles.

In Example 3, the average particle size of the single particles was 3.2 μm.

<Measurement Results for Particle Size of Adhered Fine Particles and Average Number of Adhered Fine Particles>

In Example 3, the particle size of the adhered fine particles was 0.06 μm to 0.6 μm.

Further, the average number of adhered fine particles adhered per particle of the single particles was 11.

Evaluation of Charge Transfer Resistance of LiMO3

A half cell was prepared using the LiMO3, and the charge transfer resistance was measured and found to be 6.50Ω.

Comparative Example 1

Production of LiMO4

A nickel-cobalt-manganese composite hydroxide 1 was produced following the same procedure as in Example 1.

The nickel-cobalt-manganese composite hydroxide 1 and a lithium hydroxide powder were weighed and mixed so that Li/(Ni+Co+Mn)=1.03. The mixture was calcined at 1,015° C. for 5 hours under an oxygen atmosphere while maintaining the ratio of the oxygen gas supply rate ($Nm^3$/min) to the supply rate of the mixture (kg/min) (oxygen gas supply rate/mixture supply rate) at 50, thereby obtaining a calcined powder 4.

The obtained calcined powder 4 was roughly crushed with a roll mill, and the resulting was crushed with a disc mill (Super Masscolloider MKCA6-2J, manufactured by Masuko Sangyo Co., Ltd.) driven with a gap of 100 μm and at 1200 rpm so as to give the $D_{50}$ of 100 μm or less. Then, the resulting was introduced into a pin mill (impact Mill AVIS-100, manufactured by Millsystem Co., Ltd.) driven at a rotation speed of 16000 rpm for further crushing, thereby obtaining LiMO4.

Evaluation of LiMO4

<Composition Analysis Results>

The composition analysis was implemented for the LiMO4, and the results were applied to the composition formula: $Li[Li_x(Ni_{(1-y-z-w)}Co_yMn_zM_w)_{1-x}]O_2$ (M is at least one element selected from the group consisting of Fe, Cu, Ti, Mg, Al, W, Mo, Nb, Zn, Sn, Zr, Ga, V, B, Si, S and P) to find that x=0.02, y=0.200, z=0.200, and w=0.000.

<Measurement Results for $D_{50}$ (Volume-Based 50% Cumulative Particle Size) of LiMO>

The volume-based 50% cumulative particle size ($D_{50}$) of LiMO4 was 9.9 μm.

<Results of Observation of Surface of Single Particles and Measurement of Particle Size of Single Particles>

An electron microscope image (SEM photograph) was acquired for the LiMO4.

Figure 5A:
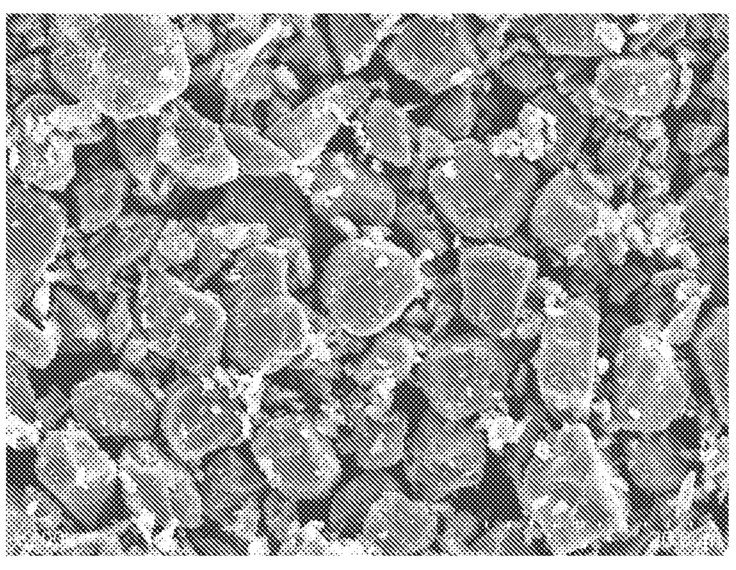
FIG. 5A is a SEM photograph of single particles contained in the lithium metal composite oxide produced in Comparative Example 1.
Figure 5B:
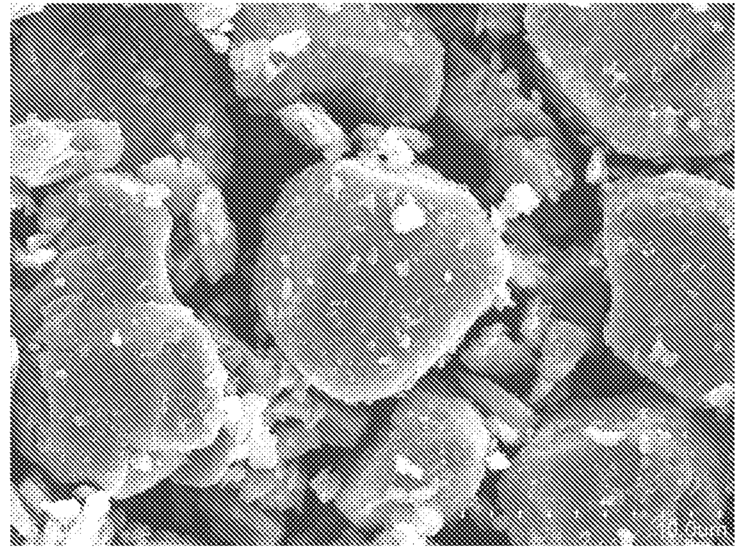
FIG. 5B is a SEM photograph of single particles contained in the lithium metal composite oxide produced in Comparative Example 1.

A SEM photograph with a 2000× field of view is shown in FIG. 5A, and a SEM photograph with a 5000× field of view is shown in FIG. 5B.

As shown in FIG. 5B, the UMO4 contained single particles. The single particles had adhered fine particles on a part of their surfaces. It was confirmed that the maximum particle size of the adhered fine particles was smaller than the particle size of the single particles.

Figure 6:
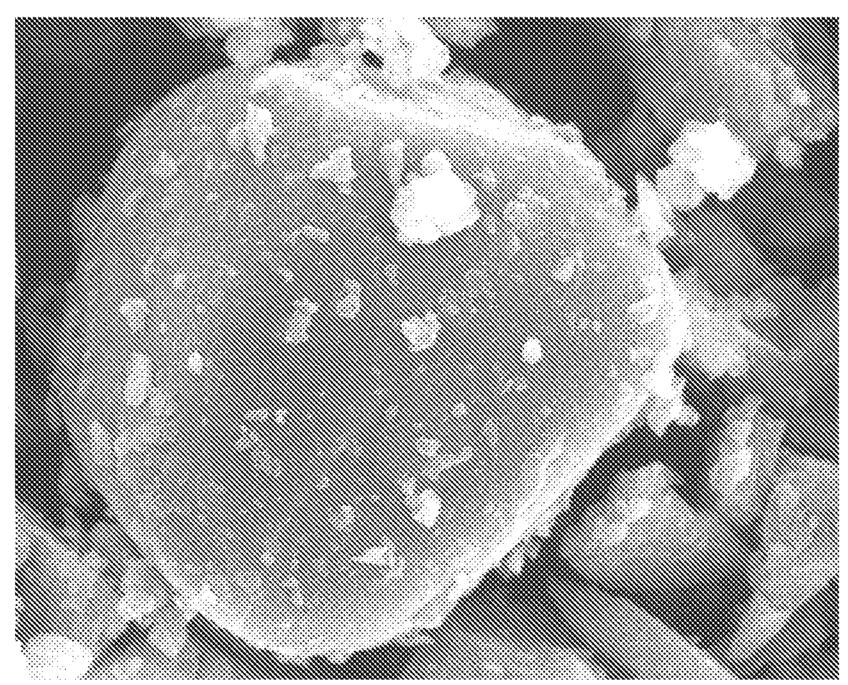
FIG. 6 is a SEM photograph of a single particle contained in the lithium metal composite oxide produced in Comparative Example 1.

An enlarged photograph (×20000) of a single particle located in the center of FIG. 5B is shown in FIG. 6.

The particle size of the single particle shown in FIG. 6 was 9.9 μm.

<Measurement Results for Particle Size of Adhered Fine Particles and Average Number of Adhered Fine Particles>

In Comparative Example 1, the particle size of the adhered fine particles was 0.0095 μm to 0.95 μm.

From FIG. 6, the number of adhered fine particles was found to be 53. Further, the average number of adhered fine particles present on the surfaces of 30 single particles was 41.

Evaluation of Charge Transfer Resistance of LiMO4

A half cell was prepared using the LiMO4, and the charge transfer resistance was measured and found to be 30.6Ω.

Comparative Example 2

Production of LiMO5

A nickel-cobalt-manganese composite hydroxide 1 was produced following the same procedure as in Example 1.

The nickel-cobalt-manganese composite hydroxide 1 and a lithium hydroxide powder were weighed and mixed so that Li/(Ni+Co+Mn)=1.03. The mixture was calcined at 790° C. for 5 hours under an oxygen atmosphere while maintaining the ratio of the oxygen gas supply rate ($Nm^3$/min) to the supply rate of the mixture (kg/min) (oxygen gas supply rate/mixture supply rate) at 5, thereby obtaining a calcined powder 4.

The obtained calcined powder 4 was roughly crushed with a roll mill, and the resulting was crushed with a disc mill (Super Masscolloider MKCA6-2J, manufactured by Masuko Sangyo Co., Ltd.) driven with a gap of 100 μm and at 1200 rpm so as to give the $D_{50}$ so of 100 μm or less. The resulting was sieved to remove coarse particles, thereby obtaining LiMO5.

Evaluation of LiMO5

The composition analysis was implemented for the LiMO6, and the results were applied to the composition formula: $Li[Li_x(Ni_{(1-y-z-w)}Co_yMn_zM_w)_{1-x}]O_2$ (M is at least one element selected from the group consisting of Fe, Cu, Ti, Mg, Al, W, Mo, Nb, Zn, Sn, Zr, Ga, V, B, Si, S and P) to find that x=0.02, y=0.200, z=0.200, and w=0.000.

<Measurement Results for $D_{50}$ (Volume-Based 50% Cumulative Particle Size) of LiMO>

The volume-based 50% cumulative particle size ($D_{50}$) of LiMO5 was 4.9 μm.

<Results of Observation of Single Particle>

The observation of the LiMO5 revealed that no single particle was present.

Evaluation of Charge Transfer Resistance of LiMO5

A half cell was prepared using the LiMO5, and the charge transfer resistance was measured and found to be 23.6Ω.

The compositions, evaluations results, etc. of Examples 1 to 3 and Comparative Examples 1 and 2 are summarized in Tables 1 to 3.

TABLE 1

| | $Li[Li_x(Ni_{(1-y-z-w)}Co_yMn_zM_w)_{1-x}]O_2$ | | | | | | |
|---|---|---|---|---|---|---|---|
| | Li x | Ni 1-y-z-w | Co y | Mn z | M w | Element M | Coating element X |
| Example 1 | 0.02 | 0.600 | 0.200 | 0.200 | 0.000 | — | — |
| Example 2 | 0.02 | 0.910 | 0.050 | 0.040 | 0.000 | — | — |
| Example 3 | 0.02 | 0.595 | 0.200 | 0.200 | 0.005 | Zr | B |
| Comparative Example 1 | 0.02 | 0.600 | 0.200 | 0.200 | 0.000 | — | — |
| Comparative Example 2 | 0.02 | 0.600 | 0.200 | 0.200 | 0.000 | — | — |

TABLE 2

| | $D_{50}$ (μm) | Presence or absence of single particles | Particle size of single particles | Particle size of adhered fine particles (μm) | Average number of adhered fine particles | Charge transfer resistance (Ω) |
|---|---|---|---|---|---|---|
| Example 1 | 5.8 | Present | The maximum particle size of the adhered fine particles is smaller than the particle size of the single particles. | 0.06 μm-0.6 μm | 13 | 7.70 |
| Example 2 | 3.3 | Present | The maximum particle size of the adhered fine particles is smaller than the particle size of the single particles. | 0.03 μm-0.3 μm | 4 | 9.90 |

TABLE 2-continued

| | $D_{50}$ (μm) | Presence or absence of single particles | Particle size of single particles | Particle size of adhered fine particles (μm) | Average number of adhered fine particles | Charge transfer resistance (Ω) |
|---|---|---|---|---|---|---|
| Example 3 | 5.5 | Present | The maximum particle size of the adhered fine particles is smaller than the particle size of the single particles. | 0.06 μm-0.6 μm | 11 | 6.50 |
| Comp. Example 1 | 9.9 | Present | The maximum particle size of the adhered fine particles is smaller than the particle size of the single particles. | 0.0095 μm-0.95 μm | 41 | 30.6 |
| Comp. Example 2 | 4.9 | Absent | — | — | 0 | 23.6 |

TABLE 3

| | Calcination temp. | Oxygen gas supply rate/mixture | Crushing method | |
|---|---|---|---|---|
| | (° C.) | supply rate | 1st step | 2nd step |
| Example 1 | 1000 | 5 | Roll mill and disc mill | Pin mill |
| Example 2 | 820 | 5 | Roll mill and disc mill | Pin mill |
| Example 3 | 1000 | 10 | Roll mill and disc mill | Pin mill |
| Comparative Example 1 | 1015 | 50 | Roll mill and disc mill | Pin mill |
| Comparative Example 2 | 790 | 5 | Roll mill and disc mill | None |

REFERENCE SIGNS LIST

1 Separator
2 Positive electrode
3 Negative electrode
4 Electrode group
5 Battery can
6 Electrolytic liquid
7 Top insulator
8 Sealing body
10 Lithium secondary battery
21 Positive electrode lead
31 Negative electrode lead
100 Laminate
110 Positive electrode
111 Positive electrode active material layer
112 Positive electrode current collector
113 External terminal
120 Negative electrode
121 Negative electrode active material layer
122 Negative electrode current collector
123 External terminal
130 Solid electrolyte layer
200 Exterior body
**200*a*** Opening
1000 All-solid-state lithium secondary battery

The invention claimed is:

1. A lithium metal composite oxide having a layered structure, comprising at least lithium, nickel, and an element X, wherein:

the lithium metal composite oxide is represented by composition formula (A):

$$Li[Li_m(Ni_{(1-n)}X_n)_{1-m}]O_2 \quad (A),$$

wherein m and n satisfy $-0.1 \leq m \leq 0.2$, $0 < n \leq 0.6$ and $0 < m+n < 0.6$, the element X is at least one element selected from the group consisting of Co, Mn, Fe, Cu, Ti, Mg, Al, W, Mo, Nb, Zn, Sn, Zr, Ga, V, B, Si, S and P, the lithium metal composite oxide contains single particles and satisfies all of requirements (1) to (5):

(1): a volume-based 50% cumulative particle size $D_{50}$ of the lithium metal composite oxide is 2 μm or more and 10 μm or less;

(2): the single particles have, on at least a part of surfaces thereof, adhered fine particles, with the proviso that a maximum particle size of the adhered fine particles is smaller than a particle size of the single particles;

(3): the particle size of the single particles is 0.2 to 1.5 times the $D_{50}$ of the lithium metal composite oxide;

(4): a particle size of the adhered fine particles is 0.01 to 0.1 times the $D_{50}$ of the lithium metal composite oxide; and (5): an average number of the adhered fine particles adhered per particle of the single particles is 1 or more and 30 or less as measured with respect to a range observable in an image obtained by scanning electron microscope.

2. The lithium metal composite oxide according to claim 1, wherein the maximum particle size of the adhered fine particles in the requirement (2) is 0.067 to 0.5 times the particle size of the single particles.

3. The lithium metal composite oxide according to claim 2, wherein the adhered fine particles are adhered to a part of the surfaces of the single particles in a non-sintered state.

4. The lithium metal composite oxide according to claim 2, which has a nickel content, Ni/(Ni+X), of 0.4 or more, in terms of a molar ratio relative to a total amount of nickel and the element X.

5. The lithium metal composite oxide according to claim 1, wherein the adhered fine particles are adhered to a part of the surfaces of the single particles in a non-sintered state.

6. The lithium metal composite oxide according to claim 1, which has a nickel content, Ni/(Ni+X), of 0.4 or more, in terms of a molar ratio relative to a total amount of nickel and the element X.

7. The lithium metal composite oxide according to claim 1, which has a BET specific surface area of 2 $m^2/g$ or less.

8. The lithium metal composite oxide according to claim 1, which comprises core particles and a coating material covering the core particles.

9. A positive electrode active material for a lithium secondary battery, the positive electrode active material comprising the lithium metal composite oxide of claim 1.

10. A positive electrode for a lithium secondary battery, the positive electrode comprising the positive electrode active material of claim 9.

11. A lithium secondary battery, comprising the positive electrode of claim 10.

12. A method for producing the lithium metal composite oxide of claim 1, comprising:

step (A) of calcining a mixture of a composite compound containing at least nickel and X, and a lithium compound containing a lithium element, thereby obtaining a calcined product; and step (B) of crushing the obtained calcined product to obtain a lithium metal composite oxide.

13. The method according to claim 12, wherein the lithium metal composite oxide is represented by composition formula (A1), and the step (A) includes calcining the mixture at 900° C. or higher to obtain the calcined product:

$$Li[Li_m(Ni_{(1-n)}X_n)_{1-m}]O_2 \quad (A1),$$

wherein m and n satisfy $0 \le m \le 0.2$, and $0.3 < n \le 0.6$.

14. The method according to claim 12, wherein the lithium metal composite oxide is represented by composition formula (A2), and the step (A) includes of calcining the mixture at 750° C. or higher to obtain the calcined product:

$$Li[Li_m(Ni_{(1-n)}X_n)_{1-m}]O_2 \quad (A2),$$

wherein m and n satisfy $0 \le m \le 0.2$, and $0 < n \le 0.3$.

15. The method according to claim 12, wherein the step (A) is a step of calcining the mixture under an oxygen atmosphere, wherein a ratio of a total oxygen gas supply amount ($Nm^3$) to a supply amount of the mixture (kg) (total oxygen gas supply amount/mixture supply amount) is 20 or less.

16. The method according to claim 12, wherein the step (B) comprises a crushing step 1 in which the calcined product obtained in the calcination step is crushed until $D_{50}$ is reduced to 100 μm or less to obtain a crushed powder 1, and a subsequent crushing step 2 in which the crushed powder 1 is crushed until $D_{50}$ falls within a range of 2 μm to less than 10 μm to obtain a lithium metal composite oxide.

17. The method according to claim 12, wherein the step (B) is carried out by a roll mill, a disc mill, a pin mill, a ball mill, a jet mill, or a counter jet mill equipped with a classification rotor.

18. A lithium metal composite oxide having a layered structure, wherein:

the lithium metal composite oxide is represented by composition formula (B):

$$Li[Li_x(Ni_{(1-y-z-w)}Co_yMn_zM_w)_{1-x}]O_2 \quad (B),$$

wherein M is at least one element selected from the group consisting of Fe, Cu, Ti, Mg, Al, W, Mo, Nb, Zn, Sn, Zr, Ga, V, B, Si, S and P; and x, y, z and w satisfy $-0.1 \le x \le 0.2$, $0 \le y \le 0.4$, $0 \le z \le 0.4$, $0 \le w \le 0.1$, and $y+z+w \le 1$, the lithium metal composite oxide contains single particles and satisfies all of requirements (1) to (5):

(1): a volume-based 50% cumulative particle size D50 of the lithium metal composite oxide is 2 μm or more and 10 μm or less;

(2): the single particles have, on at least a part of surfaces thereof, adhered fine particles, wherein a maximum particle size of the adhered fine particles is smaller than a particle size of the single particles;

(3): the particle size of the single particles is 0.2 to 1.5 times the $D_{50}$ of the lithium metal composite oxide;

(4): a particle size of the adhered fine particles is 0.01 to 0.1 times the $D_{50}$ of the lithium metal composite oxide; and (5): an average number of the adhered fine particles adhered per particle of the single particles is 1 or more and 30 or less as measured with respect to a range observable in an image obtained by scanning electron microscope.

* * * * *